United States Patent
Oba et al.

(10) Patent No.: US 7,280,851 B2
(45) Date of Patent: Oct. 9, 2007

(54) INFORMATION PROCESSING APPARATUS AND METHOD, AND RECORDING MEDIUM

(75) Inventors: Haruo Oba, Kanagawa (JP); Taku Sugawara, Tokyo (JP); Takeo Inagaki, Tokyo (JP); Junichi Rekimoto, Tokyo (JP); Nobuyuki Matsushita, Kanagawa (JP); Yuji Ayatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 10/487,813

(22) PCT Filed: Aug. 28, 2002

(86) PCT No.: PCT/JP02/08644

§ 371 (c)(1),
(2), (4) Date: Feb. 26, 2004

(87) PCT Pub. No.: WO03/021875

PCT Pub. Date: Mar. 13, 2003

(65) Prior Publication Data

US 2004/0248617 A1 Dec. 9, 2004

(30) Foreign Application Priority Data

Aug. 28, 2001 (JP) ............................. 2001-257309
Nov. 9, 2001 (JP) ............................. 2001-344969

(51) Int. Cl.
*H04B 1/00* (2006.01)
*H04B 7/00* (2006.01)
*H04Q 7/20* (2006.01)

(52) U.S. Cl. .................. 455/566; 455/456.3; 455/41.1; 455/41.2

(58) Field of Classification Search ............... 455/41.1, 455/41.2, 41.3, 418, 566, 456.3
See application file for complete search history.

(56) References Cited

U.S. PATENT DOCUMENTS 6,188,404 B1 2/2001 Rekimoto
6,668,177 B2 * 12/2003 Salmimaa et al. .......... 455/566
2003/0025738 A1 * 2/2003 Polgar et al. ................ 345/835

FOREIGN PATENT DOCUMENTS

| EP | 0 895 154 | 2/1999 |
| JP | 11-45149 | 2/1999 |
| JP | 11-53236 | 2/1999 |

OTHER PUBLICATIONS

Junichi Rekimoto, "Pick and Drop Fukusu Computer Kankyo deno User Inetrface," bit, Aug. 1, 1998, vol. 30, No. 8, pp. 31-38.

* cited by examiner

*Primary Examiner*—Barry Taylor
(74) *Attorney, Agent, or Firm*—Finnegan, Henderson, Farabow, Garrett & Dunner, L.L.P.

(57) ABSTRACT

The present invention relates to an information processing apparatus and method, recording medium, and program which allow for correct recognition of a connected electronic device. A reader/writer 33-1 is placed near a left vertical side 2-1 of four sides of an input display unit 2. A mobile phone 11 includes an RF tag. When the mobile phone 11 is placed adjacent to the reader/writer 33-1, the reader/writer 33-1 detects the RF tag to detect that the mobile phone 11 is adjacent thereto. An icon 111 of the mobile phone 11 is displayed on the input display unit 2 in a moving manner so that portions of the icon 111 appear step-by-step from the side 2-1 and finally the entirety appears. The present invention is applicable to an information processing apparatus such as a personal computer, a PDA, or a mobile phone.

22 Claims, 26 Drawing Sheets

INFORMATION PROCESSING APPARATUS AND METHOD, AND RECORDING MEDIUM

TECHNICAL FIELD

The present invention relates to an information processing apparatus and method, and a recording medium, and particularly to an information processing apparatus and method, and recording medium which allow for reliable recognition of an electronic device ready for communication.

BACKGROUND ART

Recently, the popularity of portable devices such as mobile phones and PDAs (Personal Digital Assistants) has rapidly increased. As a result, users have increased opportunities to exchange information between such portable devices.

However, it is inevitable that the portable devices include a small display unit due to its portability. Only small characters, images, etc., can therefore be displayed on the display unit.

In one approach, characters and images stored in a portable device are displayed on a display unit of a desktop personal computer, etc. In general, display units of desktop personal computers are larger than display units of portable devices, thus allowing users to view characters and images more comfortably.

For example, when a mail stored in a mobile phone is transferred to a personal computer and is displayed on a display unit thereof in an enlarged manner, connecting the mobile phone to the personal computer using a cable causes inconvenient user operation. Thus, the mobile phone may be connected to the personal computer in a wireless manner so that data is wirelessly transferred.

However, in such a case that data is wirelessly transferred from a mobile phone to a personal computer, a plurality of mobile phones may sometimes make it difficult to determine from which mobile phone the data has been transferred.

DISCLOSURE OF INVENTION

The present invention has been made in view of the above situation, and is intended to allow for reliable recognition of a partner electronic device communicating with a personal computer.

A first information processing apparatus of the present invention includes detection means for detecting an electronic device adjacent thereto, and display means for displaying an icon corresponding to the electronic device with the position, color, density, or brightness changing over time when the detection means detects the electronic device adjacent thereto.

The display means can display the icon so as to shift the position of the icon along a line towards the inside of a display unit from a side of the display unit.

The display means can display the icon so as to move along a line across the electronic device and vertical to one of the four sides of the display unit that is substantially rectangular, the side being the closest to the detection means.

The information processing apparatus can further include communication means for setting up communication with the electronic device when the detection means detects the electronic device adjacent thereto, and the display means can modify display of the icon when the communication means sets up communication with the electronic device.

The information processing apparatus can further include identification means for identifying the electronic device when the detection means detects the electronic device adjacent thereto.

The identification means can obtain identification information from the electronic device to determine the device type or category of the electronic device based on the identification information.

The detection means can include a reader/writer which communicates with an RF tag of the electronic device via electromagnetic induction, and the communication means can perform short-range wireless communication with the electronic device.

A first information processing method of the present invention includes a detection step of detecting an adjacent electronic device, and a display step of displaying an icon corresponding to the electronic device with the position, color, density, or brightness changing over time when the adjacent electronic device is detected by performing the detection step.

A program of a first recording medium of the present invention is a program for an information processing apparatus for displaying an icon corresponding to an electronic device on a display unit and for performing a predetermined process with respect to the electronic device using the icon, which includes a detection step of detecting an electronic device adjacent thereto, and a display step of displaying an icon corresponding to the electronic device with the position, color, density, or brightness changing over time when the adjacent electronic device is detected by performing the detection step.

A second information processing apparatus of the present invention includes detection means for detecting an electronic device adjacent thereto, display means for displaying an icon corresponding to the electronic device when the detection means detects the electronic device adjacent thereto, communication means for setting up communication with the electronic device when the detection means detects the electronic device adjacent thereto, and modification means for modifying the icon when the communication means sets up communication with the electronic device.

The information processing apparatus can further include identification means for identifying the electronic device when the detection means detects the electronic device adjacent thereto.

The identification means can obtain identification information from the electronic device to determine the device type or category of the electronic device based on the identification information.

The detection means can include a reader/writer which communicates with an RF tag of the electronic device via electromagnetic induction, and the communication means can perform short-range wireless communication with the electronic device.

A second information processing method of the present invention includes a detection step of detecting an adjacent electronic device, a display step of displaying an icon corresponding to the electronic device when the adjacent electronic device is detected by performing the detection step, a communication step of setting up communication with the electronic device when the adjacent electronic device is detected by performing the detection step, and a modification step of modifying the icon when communication with the electronic device is set up by performing the communication step.

A program of a second recording medium of the present invention includes a detection step of detecting an adjacent electronic device, a display step of displaying an icon relating to the electronic device when the adjacent electronic device is detected by performing the detection step, a communication step of setting up communication with the electronic device when the adjacent electronic device is detected by performing the detection step, and a modification step of modifying the icon when communication with the electronic device is set up by performing the communication step.

In the first information processing apparatus and method, and a program recorded in the first recording medium of the present invention, an icon corresponding to an electronic device is displayed with the position, color, density, or brightness changing over time.

In the second information processing apparatus and method, and a program recorded in the second recording medium of the present invention, a displayed icon is modified when communication is set up with an electronic device.

BEST MODE FOR CARRYING OUT THE INVENTION

Figure 1:
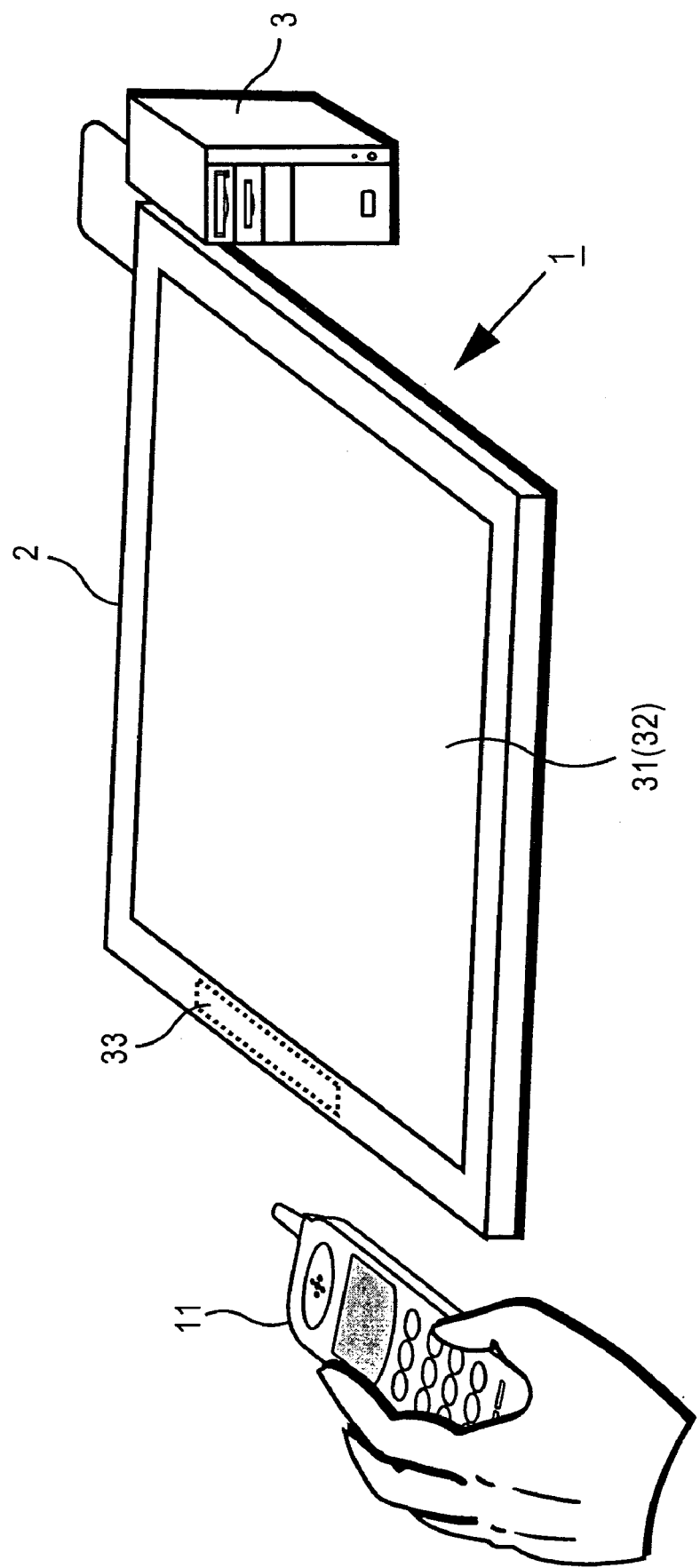
FIG. 1 is a diagram illustrating an example structure of an information processing system according to the present invention.

FIG. 1 illustrates an example structure of an information processing system according to the present invention. In this example structure, a personal computer 1 includes an input display unit 2, and a main body 3 connected to the input display unit 2. The input display unit 2 is configured so as to display required information thereon and to input the required information by operating a pen or the like (not shown) thereon.

The input display unit 2 includes a reader/writer 33, and, for example, a mobile phone 11 is placed adjacent to the reader/writer 33 by a user, as required, thereby exchanging data between the mobile phone 11 and the personal computer 1.

Figure 2:
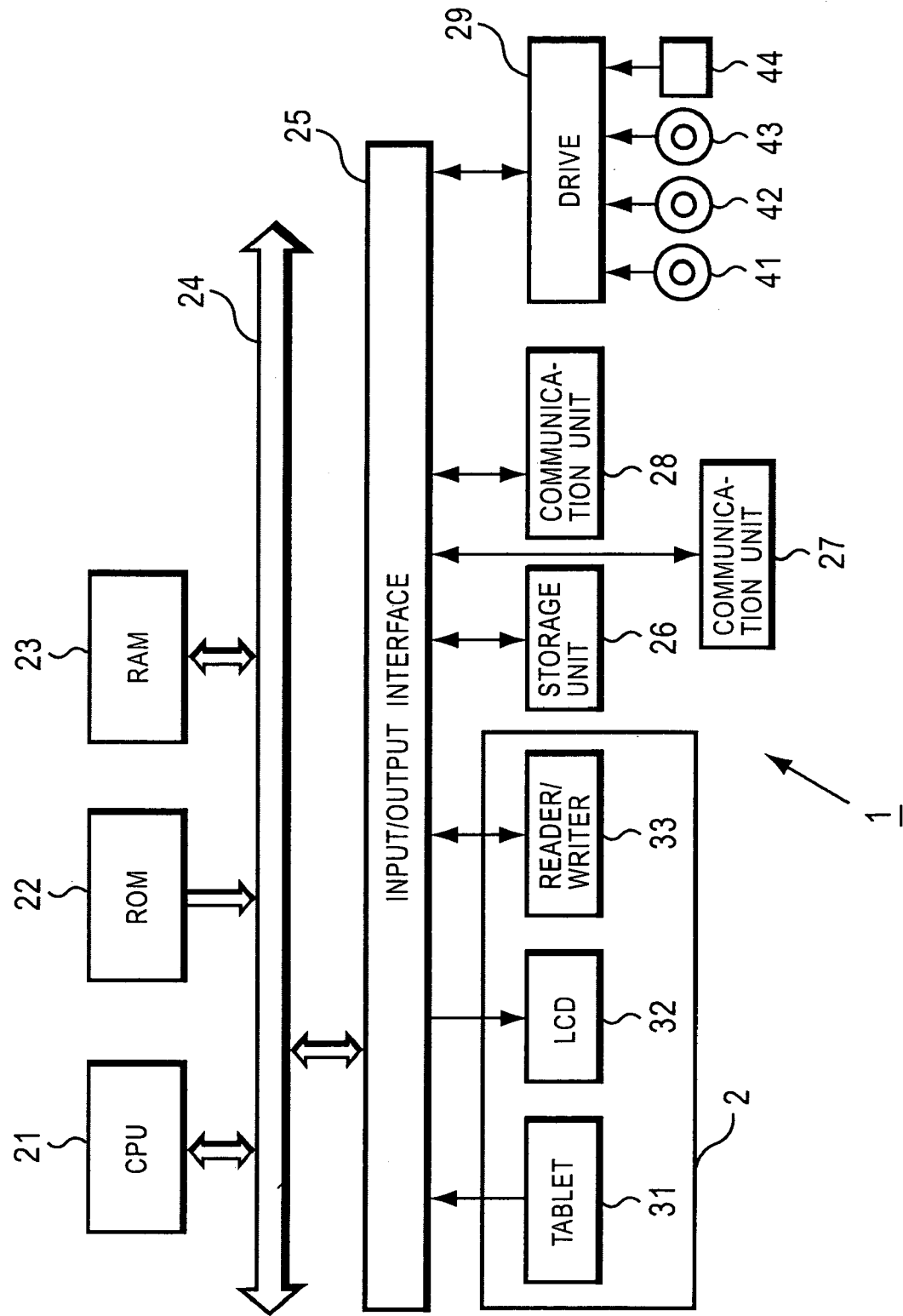
FIG. 2 is a block diagram showing an example structure of a personal computer shown in FIG. 1.

FIG. 2 illustrates an example structure of the personal computer 1. A CPU (Central Processing Unit) 21 executes various processes according to programs stored in a ROM (Read Only Memory) 22 or a storage unit 26. A RAM (Random Access Memory) 23 stores a program executed by the CPU 21, data, and so on, if necessary. The CPU 21, the ROM 22, and the ROM 23 are connected with one another via a bus 24. An input/output interface 25 is also connected with the bus 24. In addition to the input display unit 2, the storage unit 26 formed of a hard disk or the like, a communication unit 27 for communicating with the mobile phone 11 via short-range wireless communication, and a communication unit 28 for communicating with a predetermined base station in a wireless manner over a telephone communication are also connected with the input/output interface 25. The short-range wireless communication of the communication unit 27 is, for example, Bluetooth® which allows communication within a range having a radius of 10 m or shorter.

The input display unit 2 includes a see-through tablet 31 for sensing a pen operated by a user, and an LCD (Liquid Crystal Display) 32 placed underneath the tablet 31 for displaying characters, graphic images, etc. As shown in FIG. 1, the input display unit 2 further includes a reader/writer 33 for communicating with an RF tag 72 (FIG. 3) of the mobile phone 11 at an outer peripheral portion of the LCD 32 (in the example of FIG. 1, at the left portion).

A drive 29 is further connected to the input/output interface 25, and a magnetic disc 41, an optical disc 42, a magneto-optical disc 43, a semiconductor memory 44, or the like may be attached to the drive 29, if necessary. A program read from these devices, i.e., the magnetic disc 41 through the semiconductor memory 44, is supplied from the drive 29 to the storage unit 26 via the input/output interface 25.

Figure 3:
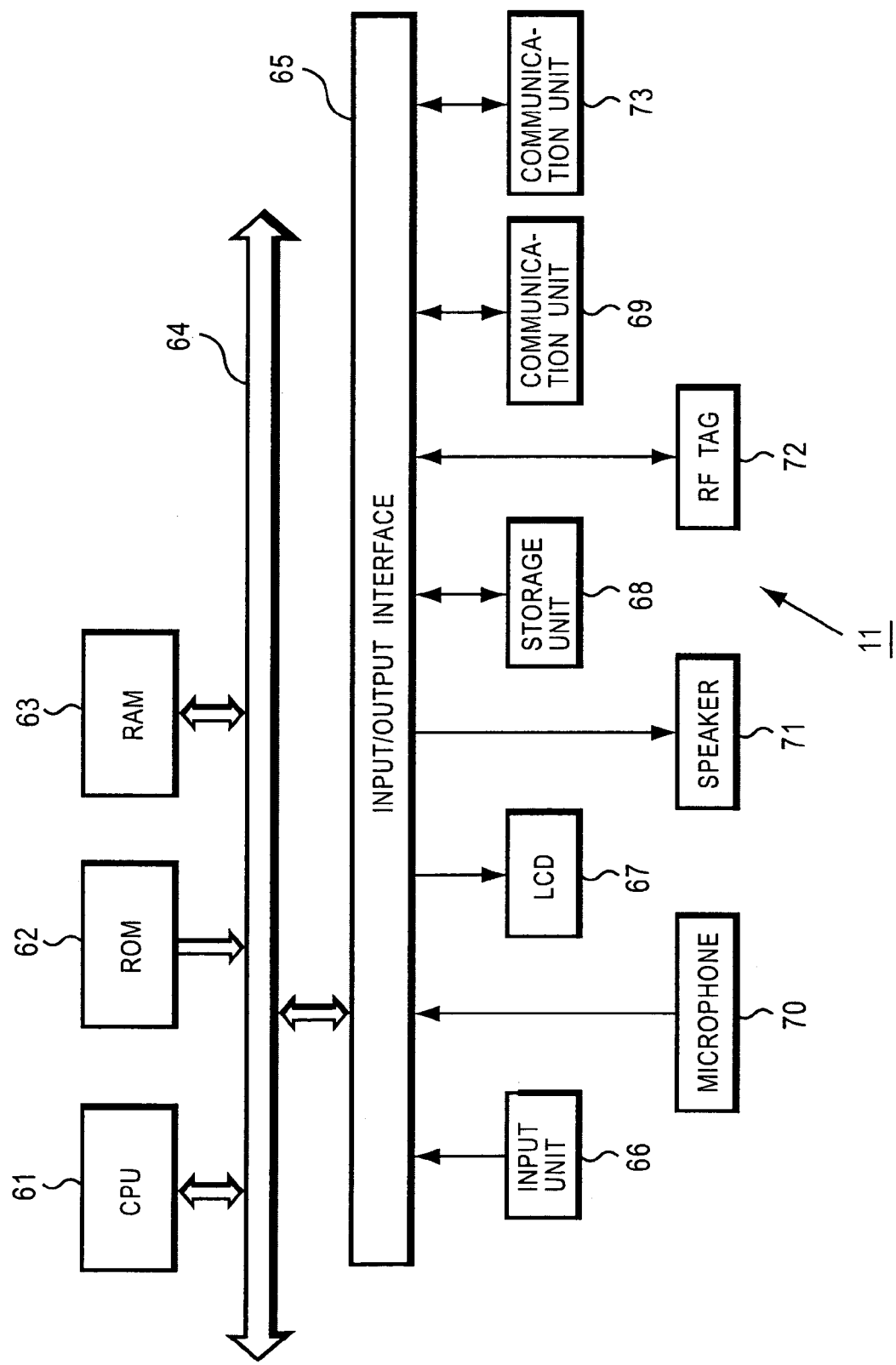
FIG. 3 is a block diagram showing an example structure of a mobile phone shown in FIG. 1.

FIG. 3 illustrates an example structure of the mobile phone 11. A CPU 61 through an input/output interface 65 basically have similar functions to those of the CPU 21 through the input/output interface 25 of the personal computer 1 shown in FIG. 2, and a description thereof is thus omitted.

In the mobile phone 11, an input unit 66 formed of various buttons, switches, or the like and an LCD (Liquid Crystal Display) 67 for displaying required information are connected to the input/output interface 65. A storage unit 68 formed of a semiconductor memory or the like and a communication unit 69 for performing communication over a telephone communication are also connected to the input/output interface 65. A communication unit 73 for performing short-range wireless communication with other electronic devices (for example, the communication unit 27 of the personal computer 1) is also connected to the input/output interface 65.

A microphone 70 captures audio signals of a user, and a speaker 71 outputs audio signals to the user. An RF tag 72 having an internal IC communicates with the reader/writer 33 of the personal computer 1 to send an identification number of the mobile phone 11 stored therein to the reader/writer 33. The RF tag 72 also has a function of storing data supplied from the reader/writer 33 to an internal memory.

The operations of the personal computer 1 and the mobile phone 11 are described below with reference to the flowcharts of FIGS. 4 and 5, respectively. When a user desires processing such as data exchange between the mobile phone 11 and the personal computer 1, the user places the mobile phone 11 adjacent to the input display unit 2 (adjacent to the reader/writer 33 indicated by the dotted region in FIG. 1).

The reader/writer 33 periodically sends electromagnetic waves in sufficiently short intervals. When the mobile phone 11 is placed adjacent to the reader/writer 33, the reader/writer 33 and the RF tag 72 of the mobile phone 11 are electromagnetically coupled to each other, thereby causing a change in equivalent impedance of a built-in antenna of the reader/writer 33. The reader/writer 33 monitors the change in impedance to determine in step S1 of FIG. 4 whether or not the mobile phone 11 is adjacent thereto, and stands by until the mobile phone 11 is placed adjacent thereto.

When the mobile phone 11 is placed adjacent to the reader/writer 33, in step S2, the reader/writer 33 requests the mobile phone 11 to send a network address. In this case, the network is constructed as a short-range wireless communication network, and the reader/writer 33 requests an identification number of the mobile phone 11.

In response to this request, the network address (identification number) is sent from the mobile phone 11 in the way described below. In step S3, the reader/writer 33 stands by until the network address is received from the mobile phone 11, and when the network address is received, in step S4, the reader/writer 33 supplies the received network address (identification number) of the mobile phone 11 to the CPU 21. The CPU 21 supplies the identification number to the RAM 23 for storage.

Then, in step S5, the CPU 21 controls the communication unit 27 to access the network address of the mobile phone 11 stored in step S4 to set up a connection on the network. More specifically, the communication unit 27 performs an authentication process based on the identification number stored in the RAM 23, and a Bluetooth connection is established between the personal computer 1 and the mobile phone 11 when authentication is successful.

Then, in step S6, the personal computer 1 executes predetermined processing with respect to the mobile phone 11 via Bluetooth wireless communication. A specific example of this processing is described below.

Figure 5:
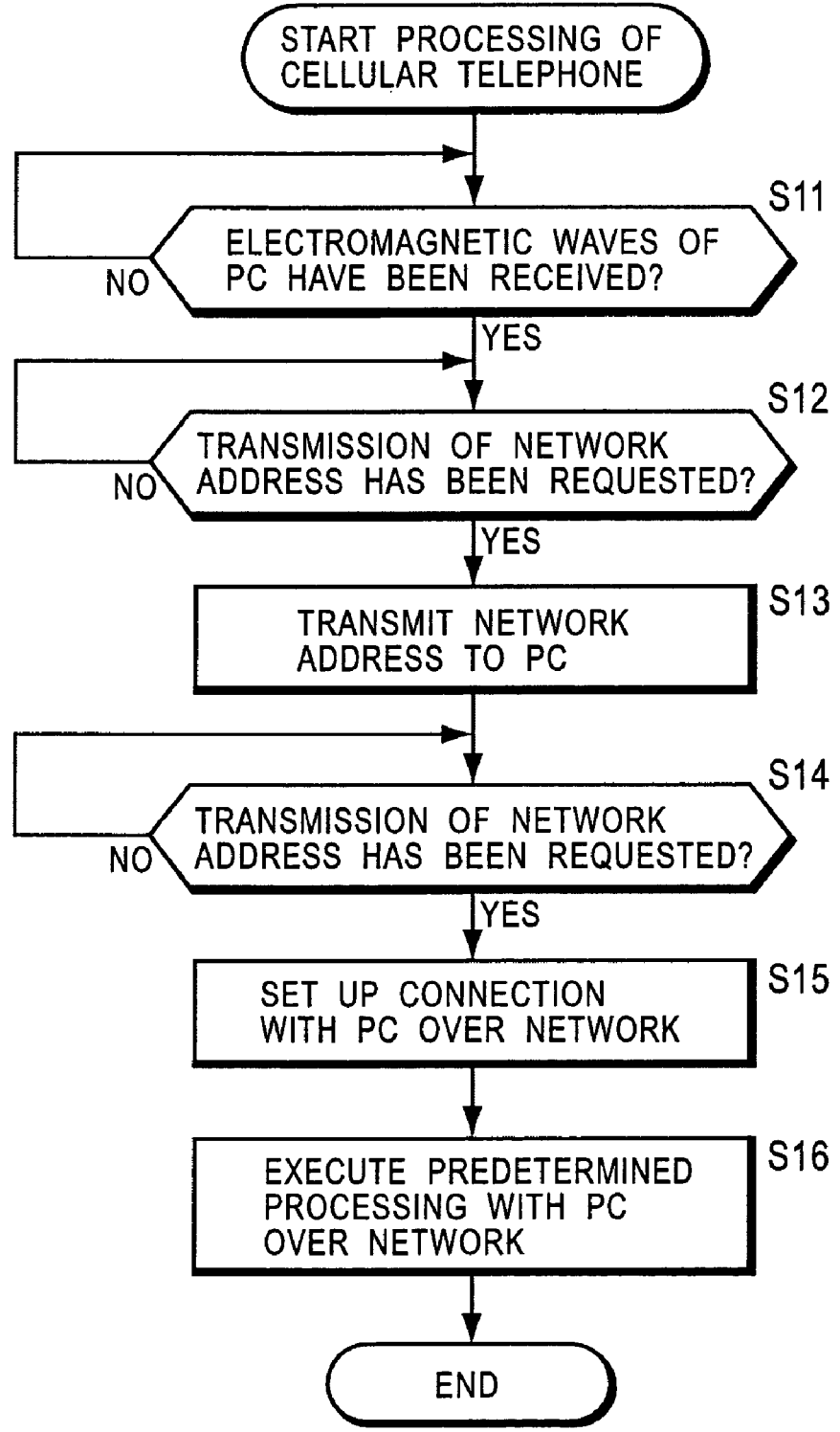
FIG. 5 is a flowchart showing processing of the mobile phone in the information processing system shown in FIG. 1.

On the other hand, in step S11 of FIG. 5, the RF tag 72 of the mobile phone 11 determines whether or not electromagnetic waves have been received from the reader/writer 33 of the personal computer 1 (determines whether or not it is adjacent to the reader/writer 33). If it is determined that the mobile phone 11 is adjacent to the reader/writer 33, then in step S12, the RF tag 72 waits for a request for a network address. As discussed above, the reader/writer 33 of the personal computer 1 requests the mobile phone 11 to send a network address in step S2, and, when it is determined that this transmission request is received, in step S13, the RF tag 72 reads the network address (in this case, identification number) of the mobile phone 11 stored in the internal memory and sends it to the reader/writer 33.

The network address may also be stored in the ROM 62 or the storage unit 68. In this case, the address read therefrom by the CPU 61 is sent from the RF tag 72.

In step S14, the CPU 61 of the mobile phone 11 stands by until it is accessed from the personal computer 1 via the communication unit 73 (in this case, the CPU 61 stands by until it is read via Bluetooth wireless communication).

If it is determined in step S14 that the communication unit 73 is invoked by the communication unit 27 of the personal computer 1 via Bluetooth wireless communication, then in step S15, in response to the invocation, the communication unit 73 sets up a connection with the personal computer 1 using Bluetooth wireless communication.

Then, in step S16, the mobile phone 11 executes predetermined processing with respect to the personal computer 1 using Bluetooth wireless communication. This processing corresponds to the processing of step S6 shown in FIG. 4.

After establishing a connection via Bluetooth wireless communication, communication is performed according to the Bluetooth wireless communication protocol (the reader/writer 33 and the RF tag 72 does not communicate with each other). Thus, if the mobile phone 11 is distant from the personal computer 1 by a distance of approximately 10 m or shorter (a distance which covers short-range wireless communication), the processing of step S16 shown in FIG. 5 and step S6 shown in FIG. 4 can be executed.

Figure 4:
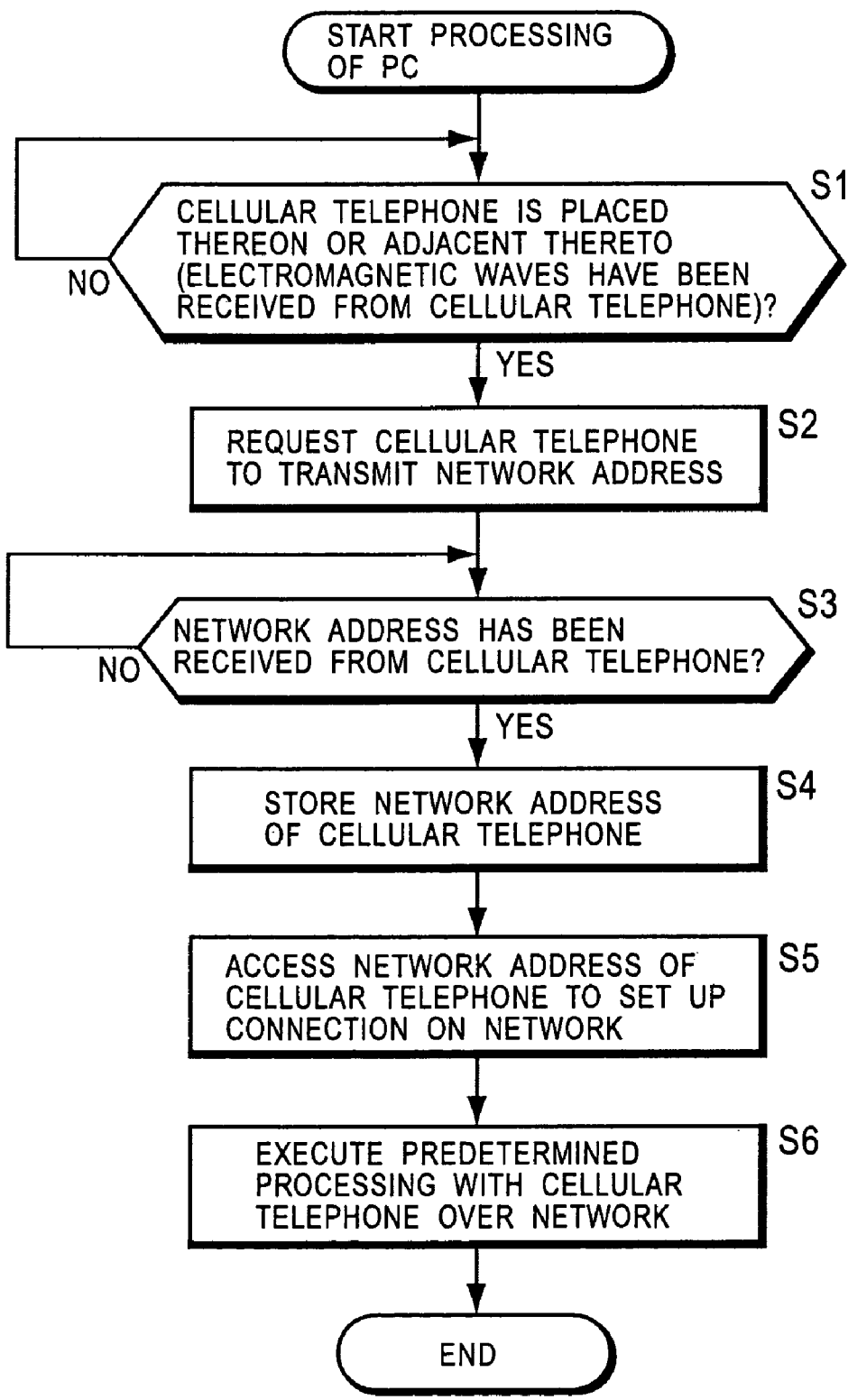
FIG. 4 is a flowchart showing processing of the personal computer in the information processing system shown in FIG. 1.

An example of the processing executed in step S6 shown in FIG. 4 and step S16 shown in FIG. 5 is further described.

Figure 6:
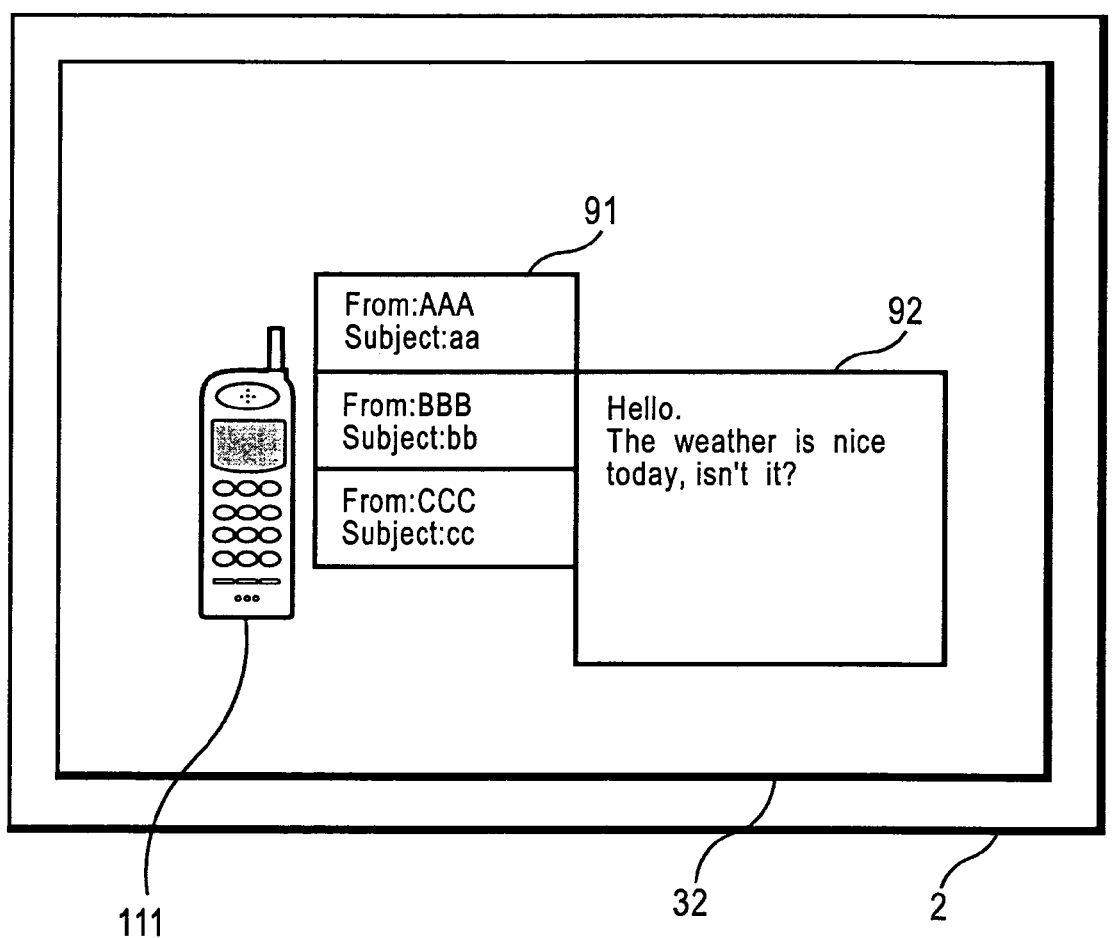
FIG. 6 is a diagram illustrating data exchange between a mobile phone and a personal computer.

FIG. 6 illustrates an example in which a mail message registered in the mobile phone 11 is displayed on the LCD 32 of the input display unit 2 in an enlarged manner when the mobile phone 11 is adjacent to the reader/writer 33 of the input display unit 2 to set up a Bluetooth communication link between the mobile phone 11 and the personal computer 1.

The processing of the mobile phone 11 and the personal computer 1 in this case is described below with reference to the flowcharts of FIGS. 7 and 8.

Figure 7:
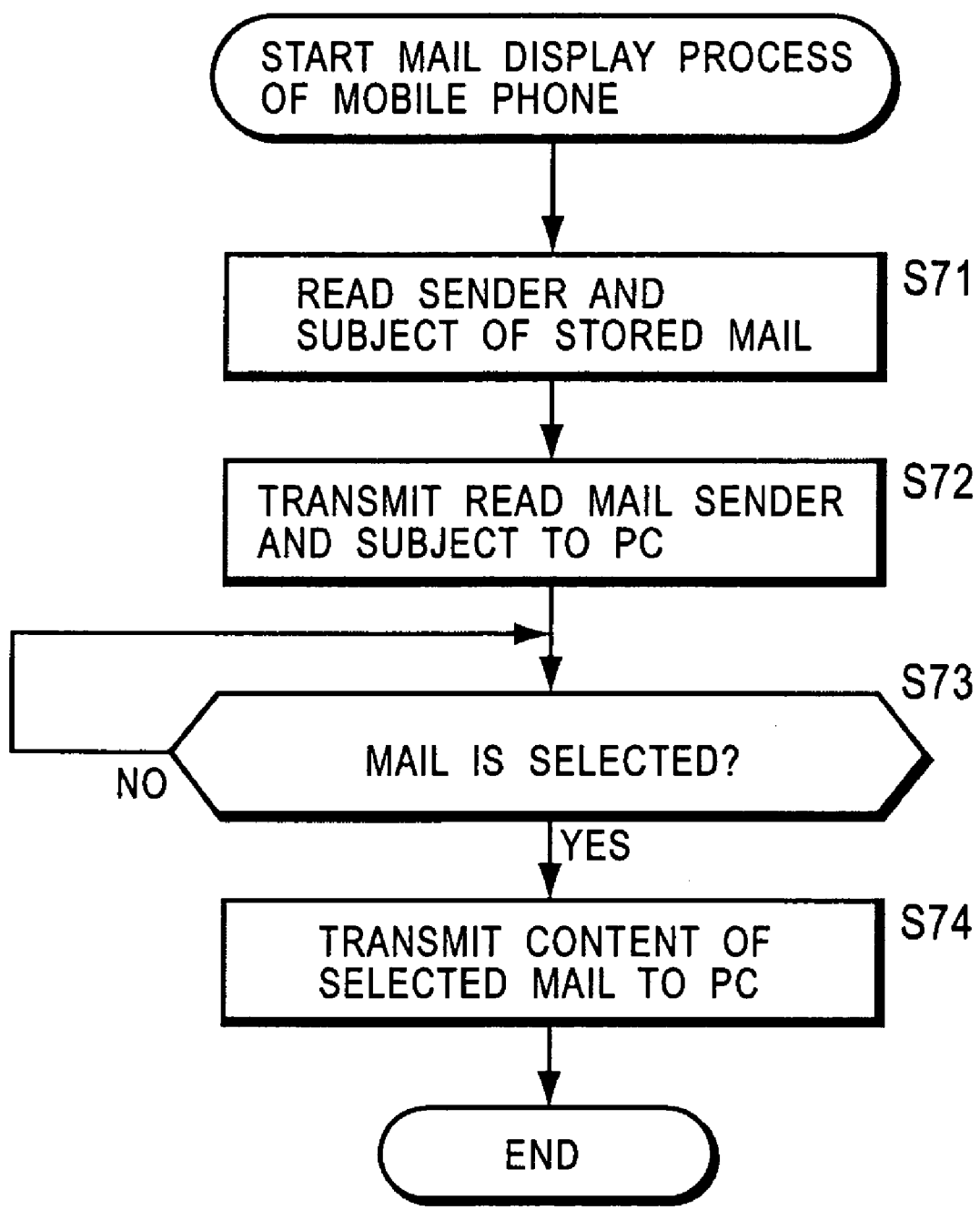
FIG. 7 is a flowchart showing processing of the mobile phone shown in FIG. 6.

In step S71 of FIG. 7, the CPU 61 of the mobile phone 11 reads the senders and subjects of previously received mails which are stored in the RAM 63, and, in step S72, the read mail senders and subjects are transmitted to the personal computer 1. Specifically, the CPU 61 controls the communication unit 73 to transmit them to the personal computer 1 via Bluetooth wireless communication.

The transmitted mail senders and subjects are displayed on the LCD 32 of the personal computer 1 in the manner shown in FIG. 6. When a user selects desired one of the displays, the selection signal is transmitted to the mobile phone 11.

Then in step S73, the CPU 61 stands by until the selected mail is informed. When the selected mail is informed, then in step S74, the CPU 61 reads the content of the selected mail from the RAM 63 and transmits the content to the personal computer 1 from the communication unit 73.

Figure 8:
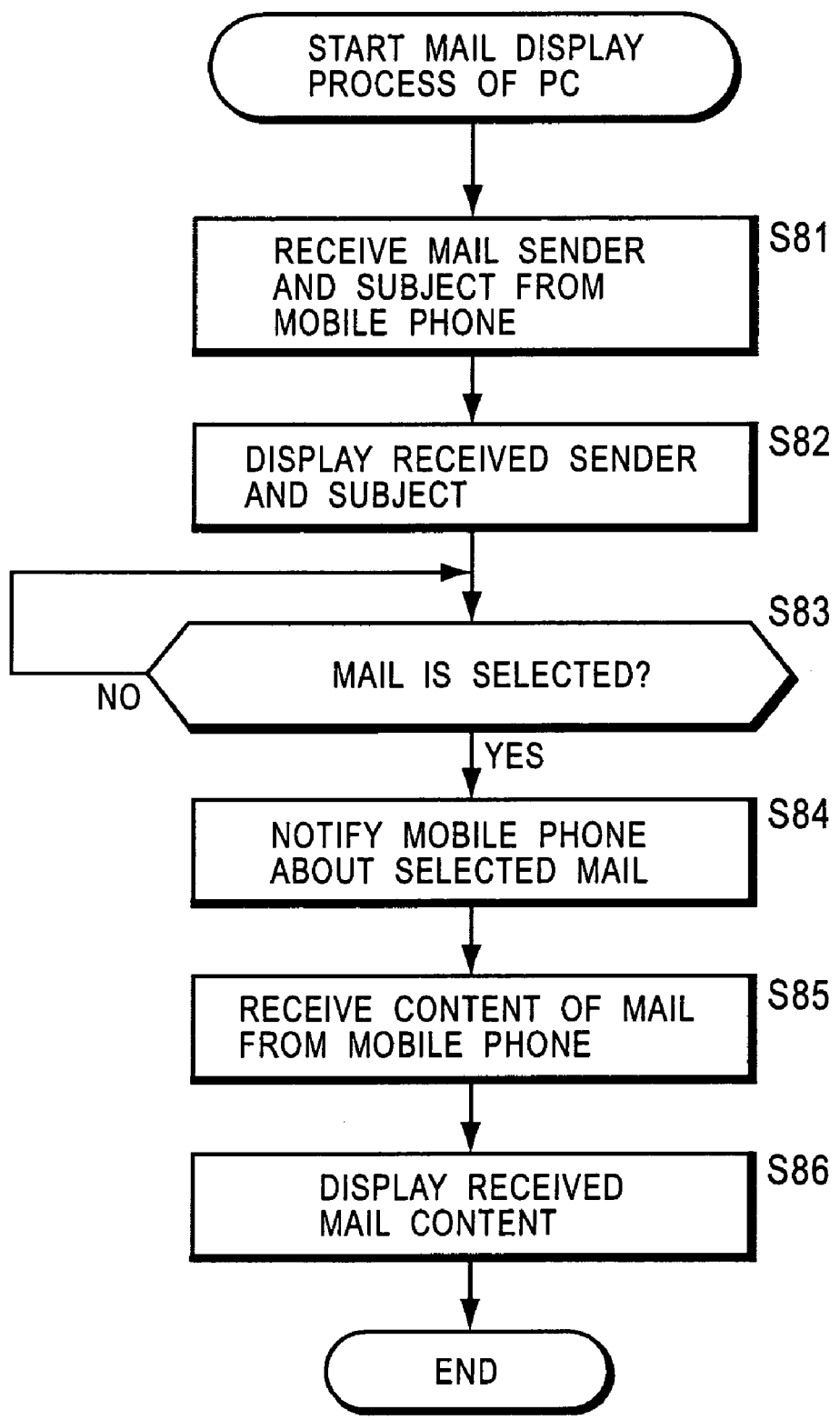
FIG. 8 is a flowchart showing processing of the personal computer shown in FIG. 6.

Correspondingly to the processing of the mobile phone 11, the personal computer 1 performs processing shown in the flowchart of FIG. 8.

First, in step S81, when mail senders and subjects are transmitted from the mobile phone 11, the CPU 21 receives them. Specifically, when mail senders and subjects are transmitted from the communication unit 73 of the mobile phone 11 via Bluetooth wireless communication, the communication unit 27 receives them and supplies them to the RAM 23 for storage. In step S82, the CPU 21 reads the senders and subjects stored in the RAM 23 and outputs them to the LCD 32 for display. Thus, the mail senders and subjects transmitted from the mobile phone 11 are displayed on a window 91 in the manner shown in FIG. 6.

A user views this display and operates a pen to designate the sender or subject of one mail in the window 91 to select the mail. Then, in step S83, the CPU 21 stands by until a mail is selected. When a mail is selected, then in step S84, the CPU 21 notifies the mobile phone 11 about the selected mail. Specifically, the CPU 21 controls the communication unit 27 to notify the mobile phone 11 of which mail was designated (selected) by the user via Bluetooth wireless communication.

When the selected mail is informed, as discussed above, the content of the selected mail is transmitted from the mobile phone 11. In step S85, the communication unit 27 receives the mail content transmitted from the mobile phone 11. The mail content is supplied to the RAM 23 for storage. Then in step S86, the CPU 21 reads the mail content stored in the RAM 23, and outputs and displays it on the LCD 32 to the right of the window 91 or at the position specified by the user using the pen (the display position is detected from the output of the tablet 31).

In this way, the content of the selected mail is displayed on the window 92 in the manner shown in FIG. 6. In the example shown in FIG. 6, the content of the second mail in the window 91 (the mail whose sender is BBB and subject is bb), i.e., "Hello. The weather is nice today, isn't it?", is displayed.

Figure 9:
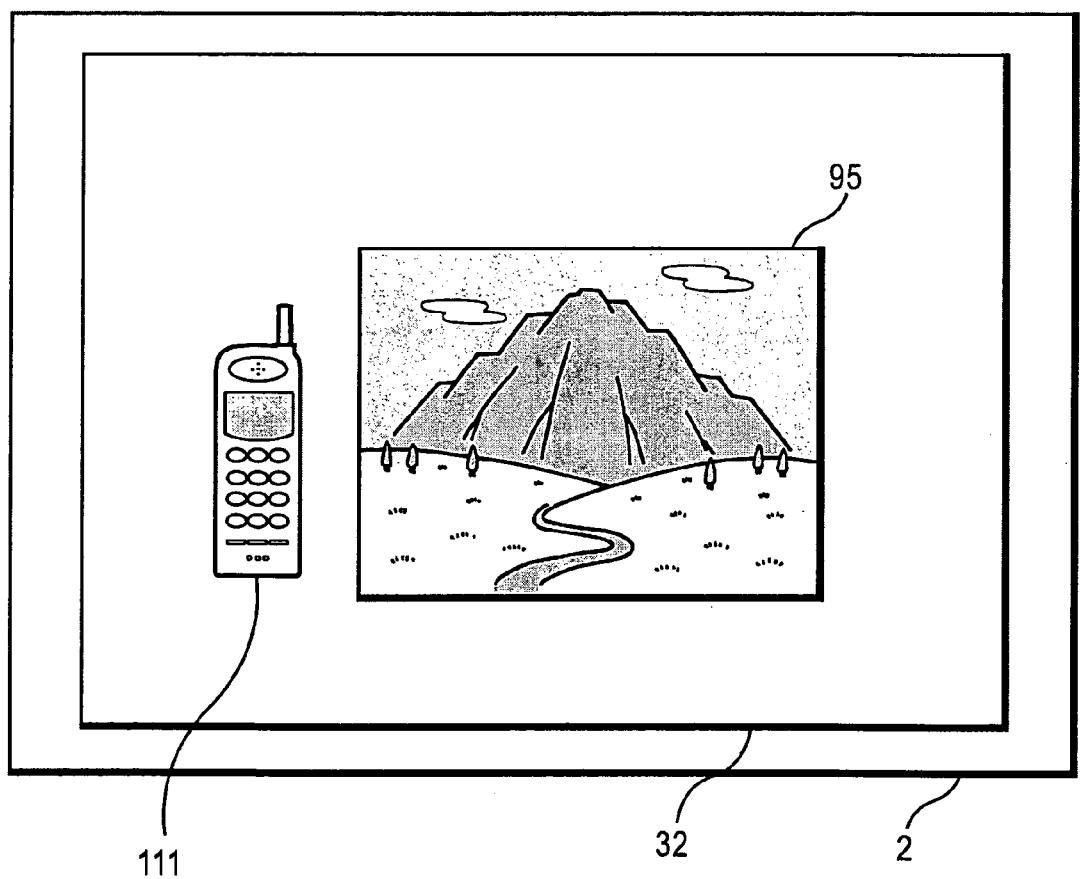
FIG. 9 is a diagram showing exchange of image data between a mobile phone and a personal computer.

While mail content is transmitted to the personal computer 1 in the foregoing description, for example, in a case where the mobile phone 11 (or a PDA) includes a built-in video camera (not shown) and stores captured stationary images or moving images in the storage unit 68, the stationary images or moving images may be sent to the personal computer 1. FIG. 9 illustrates a display example on the LCD 32 of the personal computer 1 in such a case.

In this example, an image sent from the mobile phone 11 is displayed in a window 95. When the image is a moving image, this means that an image captured by the video camera of the mobile phone 11 is displayed on the LCD 32 in real time.

As shown in FIG. 6, in the present invention, when the mobile phone 11 is detected by the reader/writer 33, an icon 111 corresponding to the mobile phone 11 is displayed on the LCD 32 of the input display unit 2. A user can use the icon 111 to instruct processing between the personal computer 1 and the mobile phone 11.

A process of the personal computer 1 for displaying the icon 111 on the LCD 32 is described below with reference to the flowchart of FIG. 10.

Figure 10:
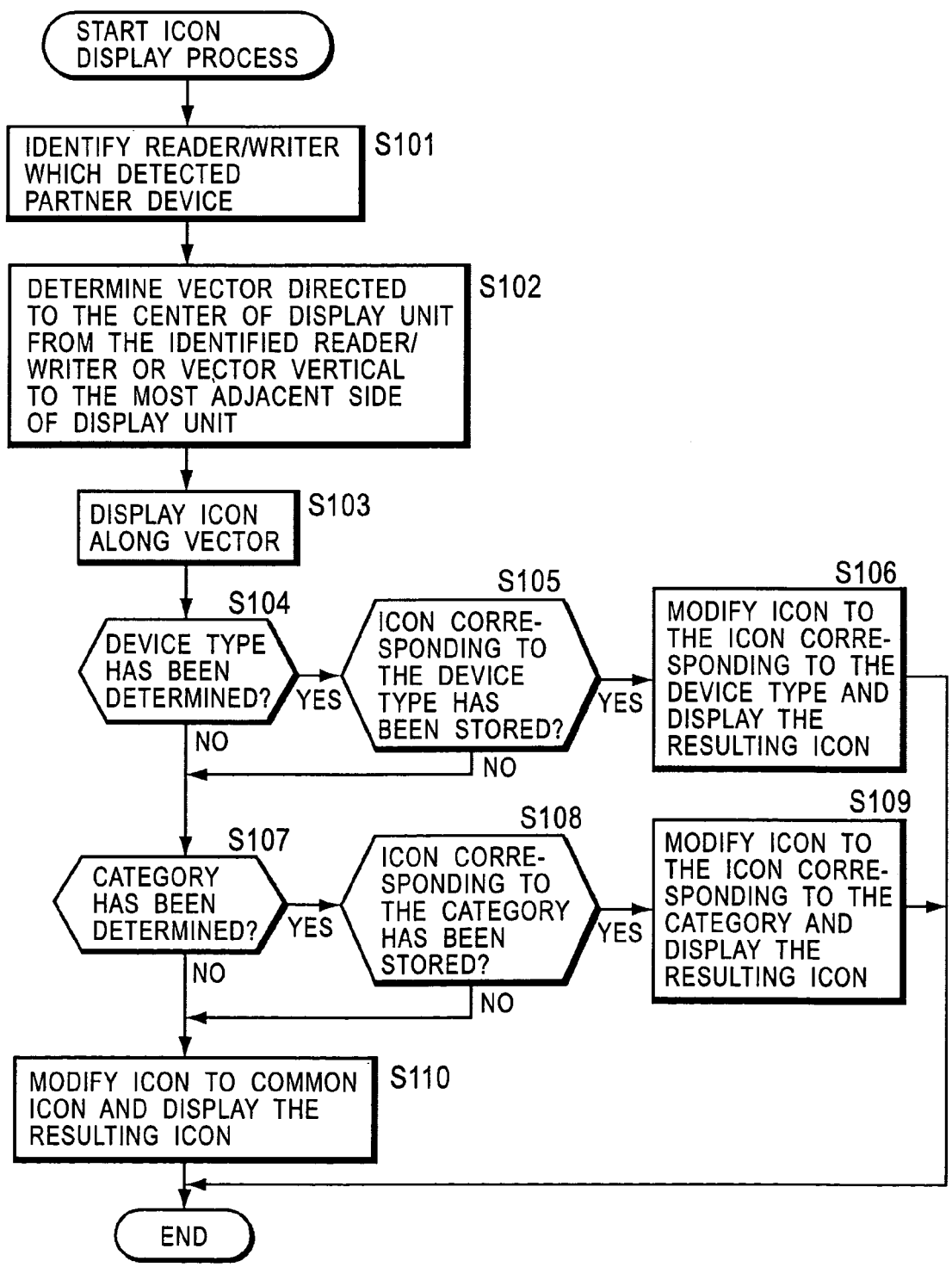
FIG. 10 is a flowchart showing an icon display process in the information processing system shown in FIG. 1.

The process shown in FIG. 10 is executed by the CPU 21 in parallel to the process shown in FIG. 4 when it is determined in step S1 of FIG. 4 that the RF tag 72 of the mobile phone 11 is detected by the reader/writer 33.

In step S101, the CPU 21 of the personal computer 1 executes a process for identifying a reader/writer which detected a partner device.

Figure 11:
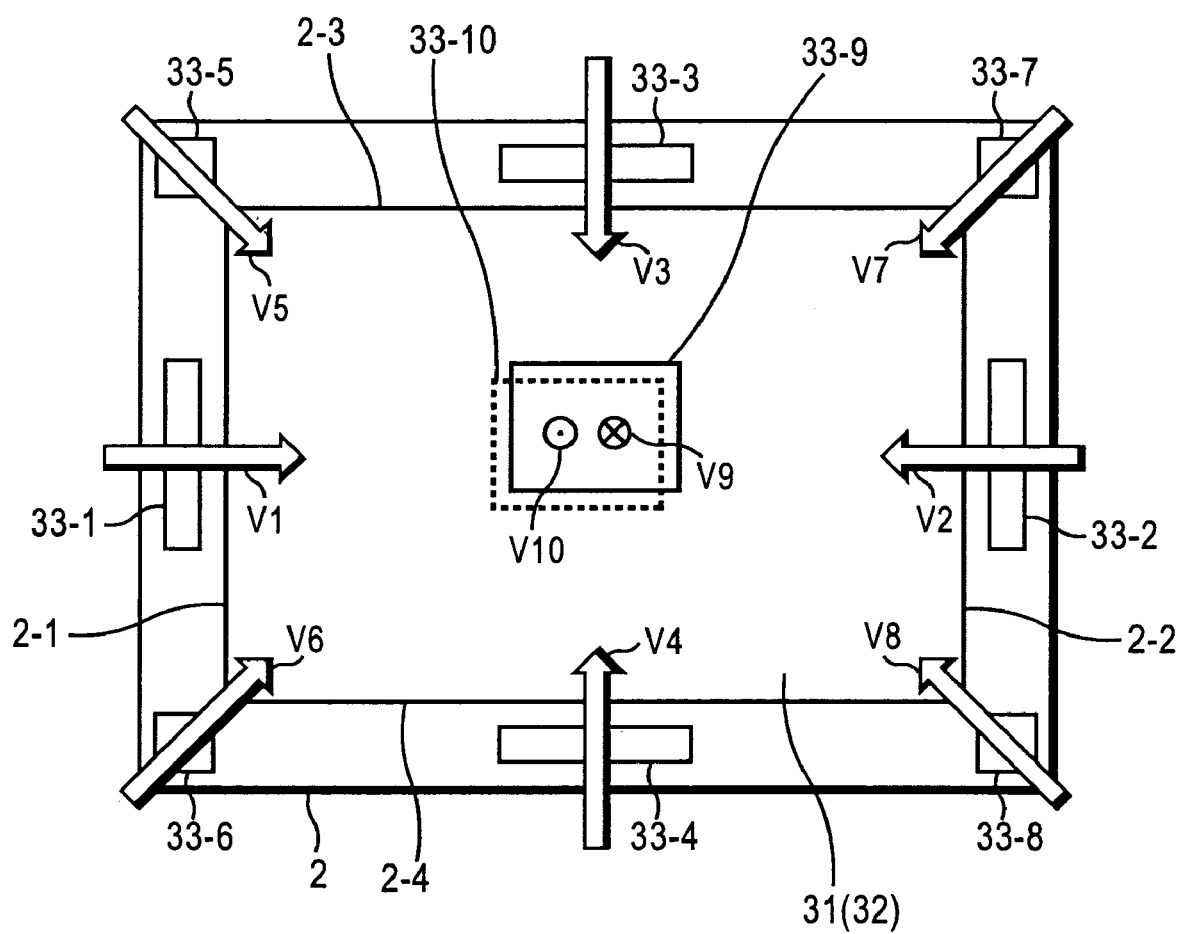
FIG. 11 is a diagram illustrating vectors.

Although one reader/writer 33 is provided in the example shown in FIG. 1, for example, as shown in FIG. 11, a plurality of readers/writers may be provided. In the example shown in FIG. 11, readers/writers 33-1 through 33-4 are placed along the left vertical side 2-1, right vertical side 2-2, the upper horizontal side 2-3, and the lower horizontal side 2-4 of the rectangular input display unit 2, respectively. Readers/writers 33-5 through 33-8 are further placed at the intersection of the sides 2-1 and 2-3, the intersection of the sides 2-1 and 2-4, the intersection of the sides 2-2 and 2-3, and the intersection of the sides 2-2 and 2-4, respectively. Readers/writers 33-9 and 33-10 are further placed at substantially the center on the upper and lower surfaces of the input display unit 2, respectively.

In step S101, the CPU 21 determines which reader/writer of the readers/writers 33-1 through 33-10 (hereinafter referred to simply as a reader/writer 33 unless it is necessary to individually identify the readers/writers 33-1 through 33-10) detected the partner device.

Then, in step S102, the CPU 21 determines a vector directed to the center of the LCD 32 from the reader/writer 33 identified in step S101 or a vector which is directed vertically to the side most adjacent to that reader/writer 33 and which passes through that reader/writer 33.

In the example shown in FIG. 11, vectors V1 through V10 respectively corresponding to the readers/writers 33-1 through 33-10 are determined.

The vectors V1 through V4 are vectors vertical to the sides 2-1 through 2-4 and passing through the readers/writers 33-1 through 33-4, respectively.

The vectors V5 through V8 are vectors which pass through the readers/writers 33-5 through 33-8, respectively, and which are directed to the center of the LCD 32.

The vectors V9 and V10 are vectors which pass through the readers/writers 33-9 and 33-10 and which are directed downwards and upwards with respect to the LCD 32, respectively.

Figure 12:
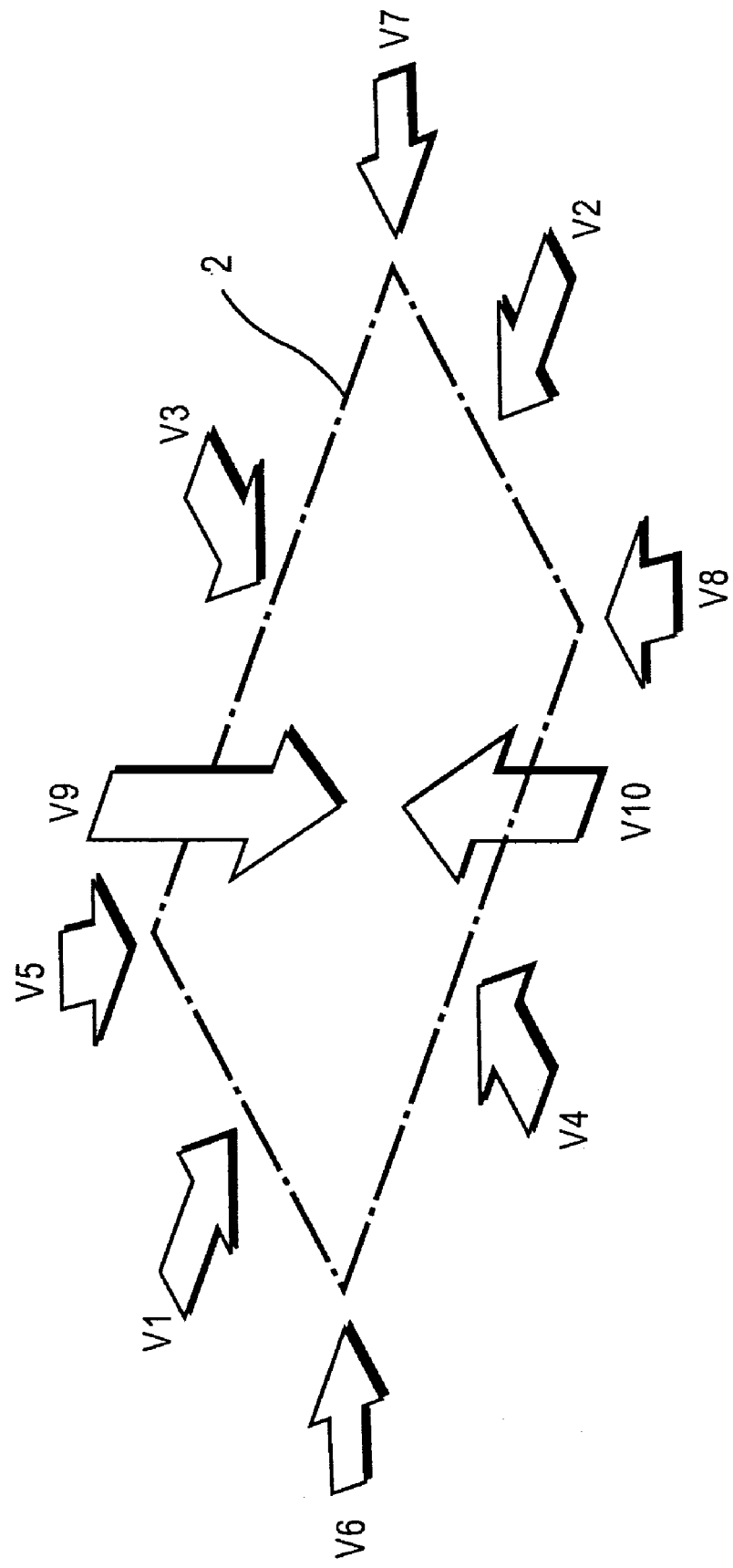
FIG. 12 is a perspective view illustrating vectors.

FIG. 12 illustrates the orientations of the vectors V1 through V10 in a simpler fashion.

Then, in step S103, the CPU 21 causes a graphic symbol (icon) corresponding to the detected partner device to be displayed so as to move along the vector determined in step S102.

Figure 13:
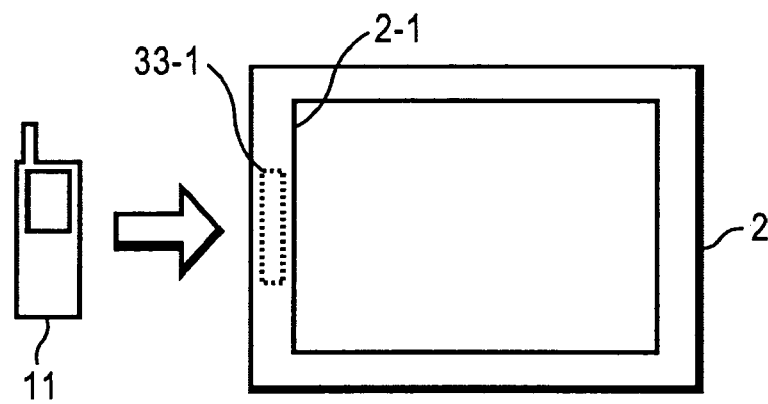
FIG. 13 is a diagram illustrating a display example of a moving icon.
Figure 14:
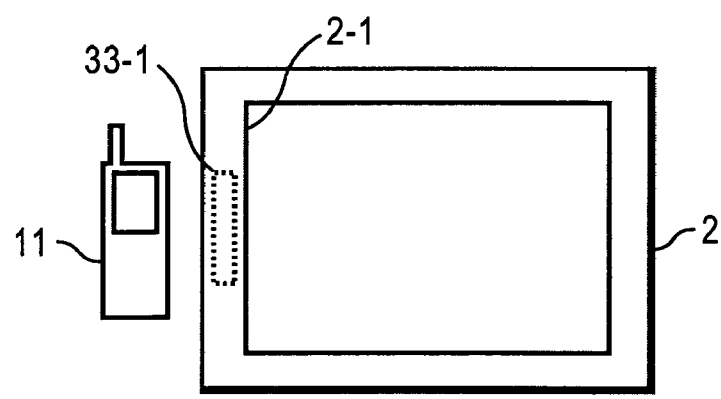
FIG. 14 is a diagram illustrating the display example of the moving icon.
Figure 15:
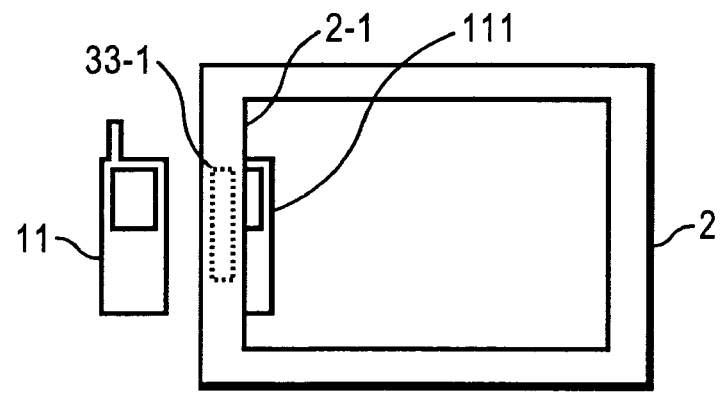
FIG. 15 is a diagram illustrating the display example of the moving icon.
Figure 16:
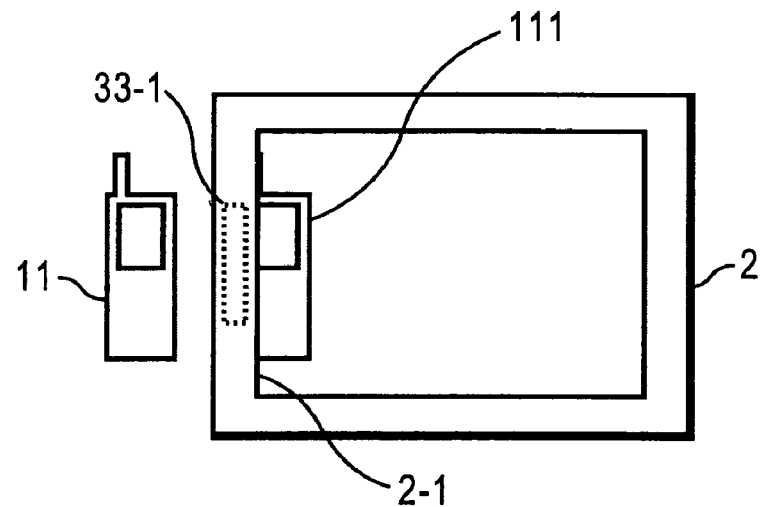
FIG. 16 is a diagram illustrating the display example of the moving icon.
Figure 17:
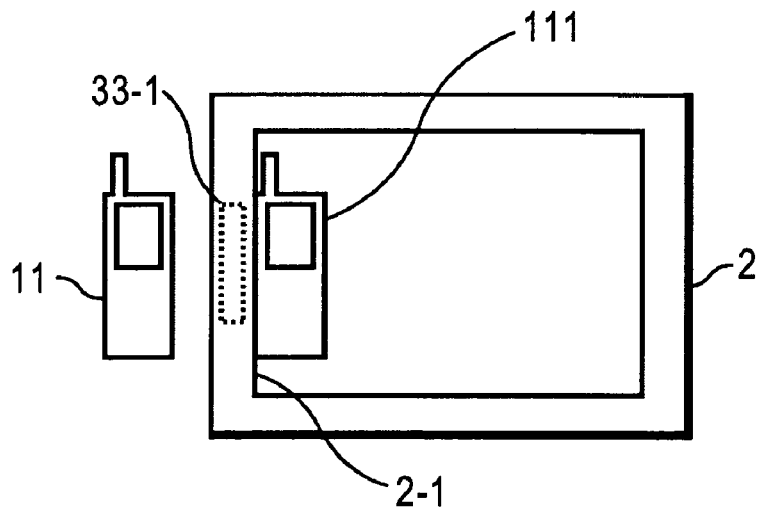
FIG. 17 is a diagram illustrating the display example of the moving icon.
Figure 18:
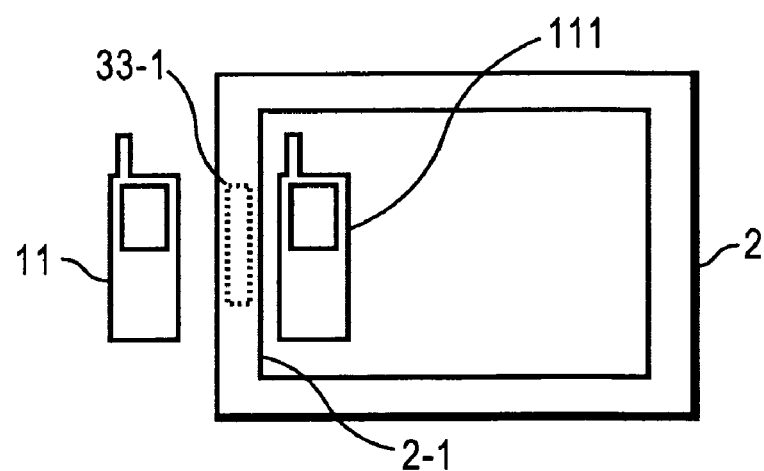
FIG. 18 is a diagram illustrating the display example of the moving icon.
Figure 19:
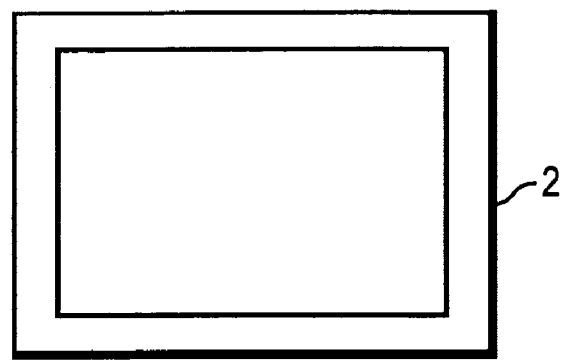
FIG. 19 is a diagram illustrating a display example of a moving icon.
Figure 20:
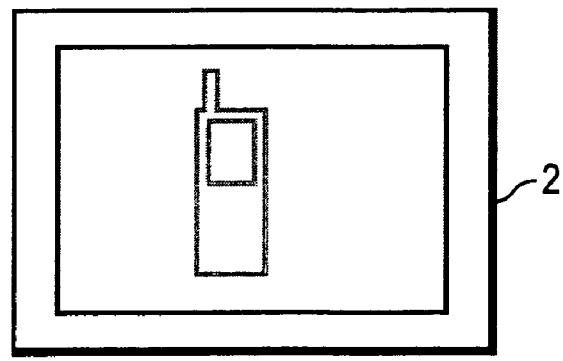
FIG. 20 is a diagram illustrating the display example of the moving icon.
Figure 21:
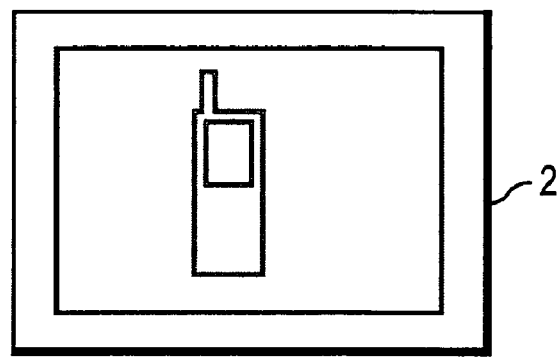
FIG. 21 is a diagram illustrating the display example of the moving icon.
Figure 22:
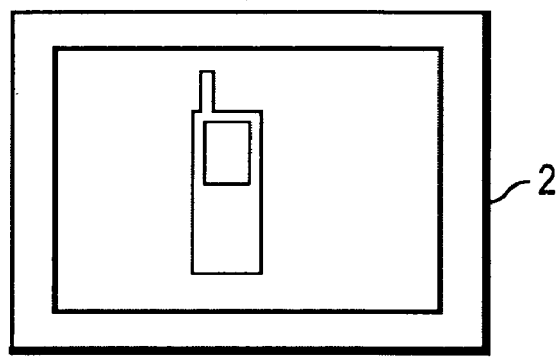
FIG. 22 is a diagram illustrating the display example of the moving icon.
Figure 23:
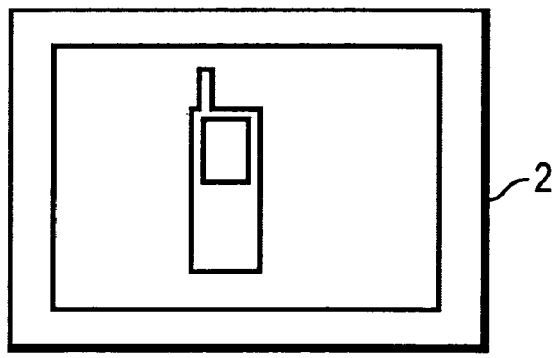
FIG. 23 is a diagram illustrating the display example of the moving icon.

FIGS. 13 through 18 illustrate a display example of this case. In this example, as shown in FIG. 13, the mobile phone 11 is approaching the reader/writer 33-1 from the left side of the side 2-1. In this arrangement of the mobile phone 11, the reader/writer 33-1 is the most adjacent reader/writer (which outputs the strongest signal). Therefore, the vector V1 is determined. Along the vector V1 (FIG. 11), the CPU 21 causes the icon 111 to be displayed so as to gradually appear from the side 2-1. As is apparent from FIGS. 13 through 18, the icon 111 does not appear in the first state, portions of the icon 111 appearing step-by-step, and finally does appear. After the entirety appears, the icon 111 further moves to the center of the LCD 32 along the vector V1.

In step S104, the CPU 21 determines whether or not the device type of the partner device has been determined. As discussed above, the CPU 21 obtains the identification number of the partner device in step S3 of FIG. 4. A user registers devices communicating with the personal computer 1 in the personal computer 1 in advance. Therefore, the storage unit 26 of the personal computer 1 has a table of device types of partner devices which the user communicates with stored in advance. The CPU 21 refers to the table to determine the device type of the partner device from the identification number (for example, the mobile phone model number).

If it is determined in step S104 that the device type of the partner device has been determined, then in step S105, the CPU 21 determines whether or not an icon corresponding to the determined device has been stored in the storage unit 26. As discussed above, when a user registers his device in the personal computer 1 beforehand, the CPU 21 causes the corresponding icon to this device type to be stored in correspondence with the identification number of the device. For example, when the partner device is a mobile phone having a certain model number, a mobile phone icon corresponding to that model number is stored; when the partner device is a PDA having a certain model number, a PDA icon corresponding to that model number is stored.

If the partner device is a device registered in advance, therefore, the corresponding icon has been stored. In this case, the process proceeds from step S105 to step S106, in which the CPU 21 modifies the icon displayed in step S103 to the registered icon.

In other words, the icon (graphic symbol) initially shown in step S103 indicates that a certain partner device has been detected and is commonly used for all partner devices. This icon is expressed as a simple contour line (profile line) of, for example, an electronic device.

The icon expressed as a line is modified to an icon corresponding to the actual device shape, structure, or the like in step S106. This helps the user determine that the personal computer 1 correctly identifies the device.

Since the partner device is a device registered in advance, icons indicating specific device characteristics such as shapes and colors have been registered. An icon corresponding to that device type is read from the storage unit 26 for display.

In this case, therefore, for example, mobile phones having different device types (model numbers) are represented as different icons.

When the identification number contains information for identifying the device type, the device type can be determined based on the read identification number without pre-registration of that device. However, since the device itself has not been registered in this case, an icon corresponding to the device type has not been stored. In such a case, even if the device type is successfully determined, an icon corresponding to the device type has not been stored, and the process proceeds to step S107. If it is determined in step S104 that the device type has not been determined, the process also proceeds to step S107.

In step S107, the CPU 21 determines whether or not the category has been determined even if the type of the partner device is not successfully determined. That is, the category of the partner device, such as a mobile phone or a PDA, is determined in this step. If the partner device has not been registered beforehand, in some cases, the category of the partner device can be determined from the identification number. In such cases, the process proceeds to step S108, in which the CPU 21 determines whether or not an icon corresponding to the category of the partner device has been stored. If the icon corresponding to the category of the partner device has been stored, then in step S109, the CPU 21 modifies the icon displayed in step S103 to the icon corresponding to the category of the partner device. The displayed icons for, for example, mobile phones are the same regardless of the types of mobile phones. Different types of PDAs are represented as a common PDA icon.

If it is determined in step S107 that the category of the partner device is not successfully determined either, or if it is determined in step S108 that, although the category is successfully determined, an icon corresponding to this category has not been stored, then in step S110, the CPU 21 modifies the icon displayed in step S103 to a common icon commonly used for all partner devices.

After icon modification in step S106, S109, or S110, when the user performs a predetermined operation using the modified icon, the CPU 21 accepts the operation. In other words, although the icon displayed in step S103 (the icon before the modification processing of step S106, S109, or S110) has the ability to cause the personal computer 1 to inform the user of a detected partner device, the icon cannot actually be used to instruct the personal computer 1 to execute predetermined processing.

On the other hand, when the user operates the icon modified in step S106, S109, or S110, the CPU 21 accepts the operation to execute processing corresponding to the operation.

FIGS. 19 through 23 illustrate a display example in which a partner device is detected by the reader/writer 33-9 or 33-10 shown in FIG. 11. In this display example, the icon is displayed so as to become dark step-by-step. In this example, the display state changes stepwise while the display position is fixed.

It is noted that icon display along the vector V9 gives an impression as if the icon was falling.

Figure 24A:
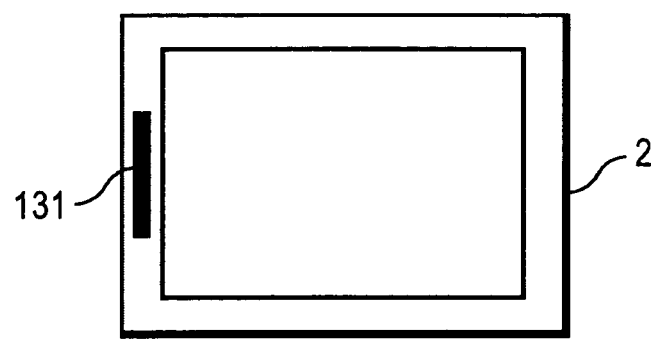
FIG. 24A is a diagram illustrating a marker.
Figure 24B:
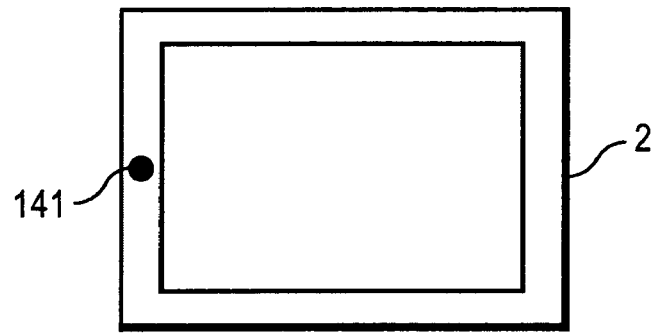
FIG. 24B is a diagram illustrating another marker.

Since the reader/writer 33 detects the RF tag 72 using electromagnetic induction, the reader/writer 33 cannot detect the partner device unless the partner device is sufficiently adjacent to the reader/writer 33. For example, in the example shown in FIG. 1 where the reader/writer 33 is placed only at the position facing the left side 2-1 of the LCD 32, the reader/writer 33 cannot detect a partner device which is placed adjacent to the right side 2-2, the upper side 2-3, or the lower side 2-4. Preferably, for example, as shown in FIGS. 24A and 24B, a rectangular marker 131 (FIG. 24A) or a circular marker 141 (FIG. 24B) is printed or affixed to the position at which the reader/writer 33 is located so as to allow the user to clearly recognize the position. This enables the user to place the partner device adjacent to the edge 2-1 without confusion.

However, in a case where the icon 111 is displayed so as to move along a vector from a particular side to the center of the LCD 32 in the manner shown in FIGS. 13 through 18, the user can recognize the position of the reader/writer 33 without a printed or affixed marker.

Specifically, as shown in FIGS. 13 through 18, in which the icon 111 is displayed so as to gradually appear from the side 2-1, the user can easily recognize the reader/writer 33 is adjacent to the side 2-1.

Furthermore, when the icon 112 is displayed so as to gradually appear from the side 2-*i* (i=1, 2, 3, or 4), the user can easily recognize the correspondence between the displayed icon and the actual partner device corresponding to the icon.

Figure 25:
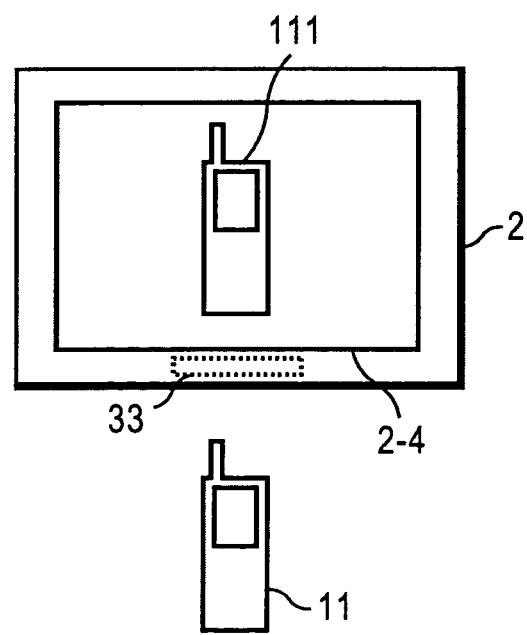
FIG. 25 is a diagram illustrating another example of icon display.

For example, as shown in FIG. 25, when the mobile phone 11 is detected by the reader/writer 33, the icon 111 may be displayed instantly at a predetermined position (in the example shown in FIG. 25, the center), not in such a manner that a part of the icon 111 gradually appears from the side 2-4 and finally the entirety is displayed.

Figure 26:
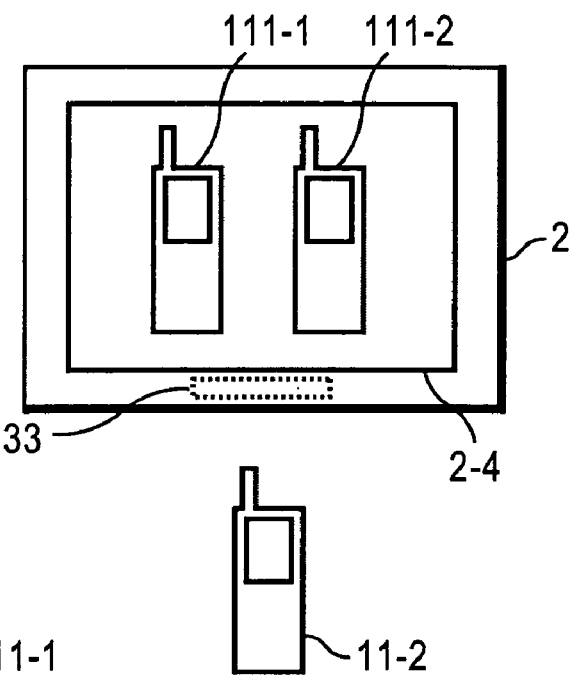
FIG. 26 is a diagram illustrating still another example of icon display.

However, as shown in, for example, FIG. 26, when a second mobile phone 11-2 is placed close to the reader/writer 33 while an icon 111-1 corresponding to a first mobile phone 11-1 is being displayed, if an icon 111-2 corresponding to the second mobile phone 11-2 is also instantly displayed, it is difficult for a user to identify which icon of the icon 111-1 and the icon 111-2 corresponds to the second mobile phone 11-2. In order to identify both icons, the user must keep his eyes focused on the display so as not to miss the moment at which the icon 111-2 is added to the displayed icon 111-1.

This drawback becomes more serious when the icon 111-1 and the icon 111-2 are substantially the same image icons.

In the present invention, on the other hand, when the second icon 111-2 is displayed so as to move from the side 2-4 over time, a user can more easily recognize that the icon 111-2 corresponds to the second mobile phone 11-2. As discussed above, there is no need for the partner device to be adjacent to the reader/writer 33 once the corresponding icon is displayed (after a communication link is set up), and therefore the position of the icon does not necessarily correspond to the position of the corresponding partner device.

For example, if the first icon 111-1 is displayed to the left and the second icon 111-2 is displayed to the right, the first mobile phone 11-1 is not necessarily placed to the left with respect to the second mobile phone 11-2.

This case also enables a user to easily recognize which icon corresponds to the second mobile phone 11-2.

Figure 27:
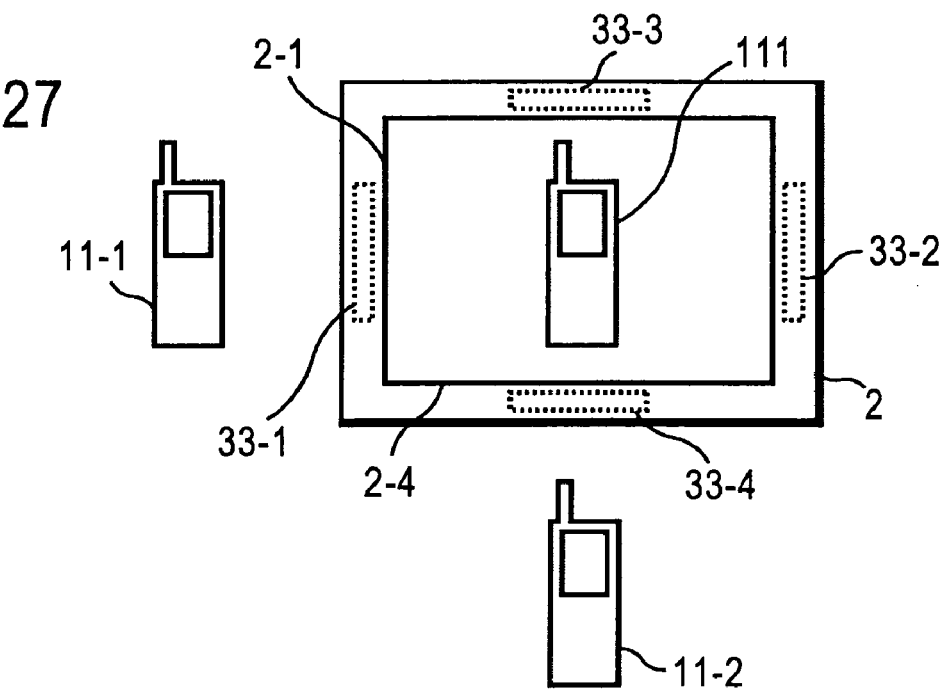
FIG. 27 is a diagram illustrating still another example of icon display.

As shown in FIG. 27, furthermore, when the user places the mobile phone 11-1 adjacent to the reader/writer 33-1 and the second mobile phone 11-2 adjacent to the reader/writer 33-4 at the same time, the icon 111 corresponding to the earlier detected mobile phone is displayed on the LCD 32. Assuming that the icon 111 is displayed at the center instantly, it is difficult for the user to recognize which mobile phone of the mobile phones 11-1 and 11-2 corresponds to the icon 111.

In the present invention, on the other hand, the icon 111 is displayed so as to gradually appear from the side 2-1 or 2-4, thus allowing the user to recognize the icon 111 correspond to the mobile phone 11-1 when the icon 111 is displayed so as to gradually appear from the side 2-1, and recognize the icon 111 correspond to the mobile phone 11-2 when the icon 111 is displayed so as to gradually appear from the side 2-4.

While the reader/writer 33 is placed near the outer periphery of the LCD 32 in the foregoing description, the present invention can be applied to the case where the reader/writer 33 is sufficiently distant from the LCD 32. Examples of this case are described below.

Figure 28:
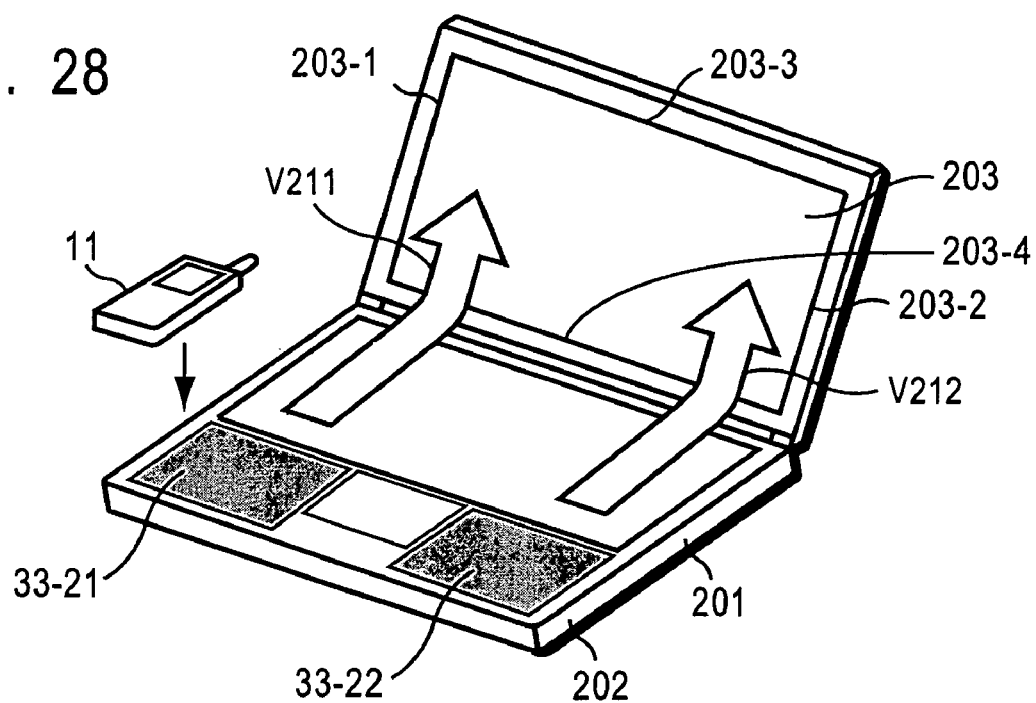
FIG. 28 is a diagram illustrating still another example of icon display.

FIG. 28 illustrates a notebook personal computer 201. The notebook personal computer 201 includes a main body 202 and a display unit 203 rotatable with respect to the main body 202. Readers/writers 33-21 and 33-22 are placed near the left and right edges of the main body 202. When the mobile phone 11 is placed adjacent to the reader/writer 33-21, an icon is displayed so as to move along a vector V211 across the reader/writer 33-21 and vertical to the side 203-4 of the four sides 203-1 through 203-4 of the display unit 203 which is the closest to the reader/writer 33-21.

Likewise, when the mobile phone 11 is placed adjacent to the reader/writer 33-22, an icon is displayed so as to move along a vector V212 vertical to the side 203-4 and across the reader/writer 33-22.

Figure 29:
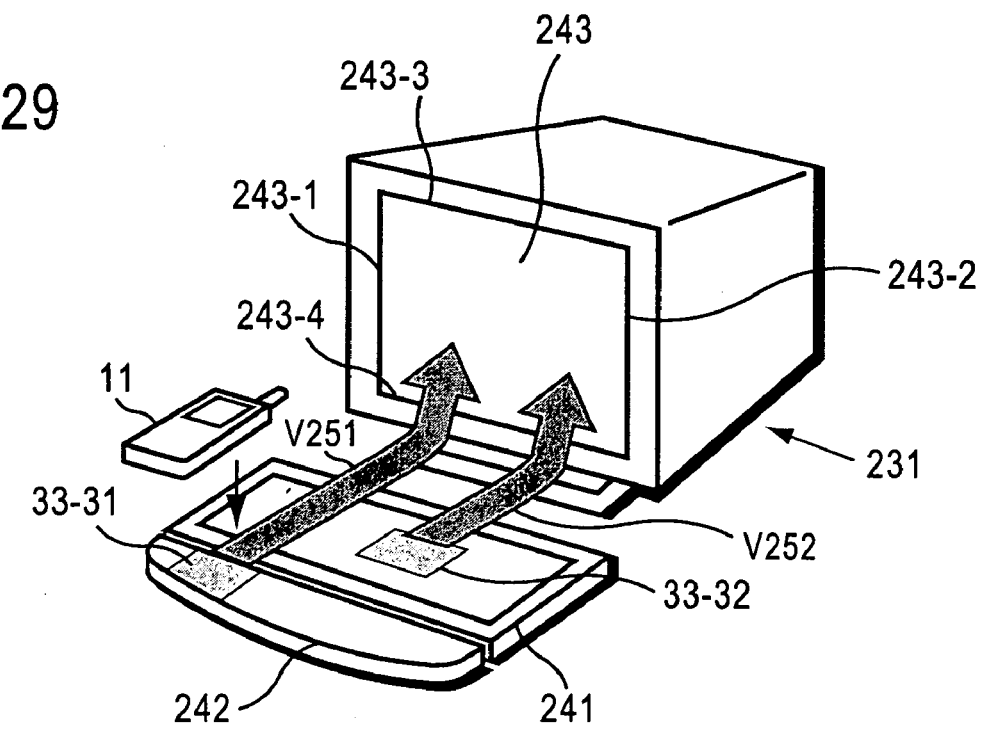
FIG. 29 is a diagram illustrating still another example of icon display.

FIG. 29 illustrates an example of a desktop personal computer 231. In this example, a reader/writer 33-31 is placed on a board 242, and a reader/writer 33-32 is placed on a keyboard 241. Out of the four sides 243-1 through 243-4 of a CRT 243, the side 243-4 is the closest to the readers/writers 33-31 and 33-32. Thus, when the mobile phone 11 is placed adjacent to the reader/writer 33-31, an icon is displayed so as to gradually appear from the side 243-4 along a vector V251 across the reader/writer 33-31 and vertical to the side 243-4. When the mobile phone 11 is placed adjacent to the reader/writer 33-32, an icon is displayed so as to gradually appear from the side 243-4 along a vector V252 across the reader/writer 33-32 and vertical to the side 243-4.

Figure 30:
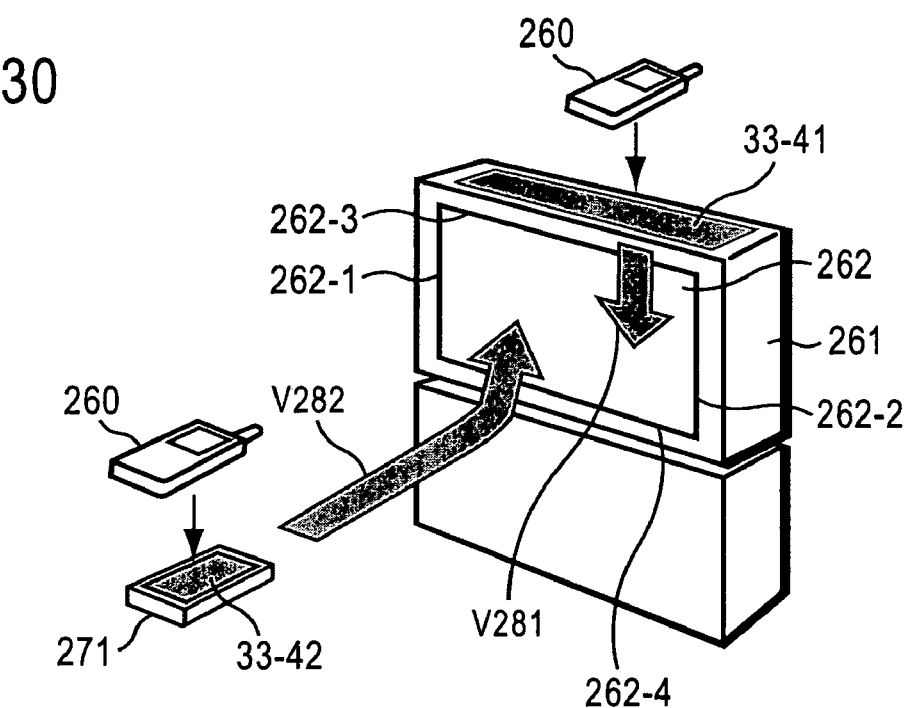
FIG. 30 is a diagram illustrating still another example of icon display.

In the example shown in FIG. 30, a reader/writer 33-41 is placed on the top surface of a television receiver 261. Thus, when a remote commander 260 having an RF tag is placed adjacent to the reader/writer 33-41, an icon is displayed so as to gradually appear from the side 262-3 along a vector 281 vertical to the side 262-3 of the four sides 262-1 through 261-4 of a display unit 262 of the television receiver 261 which is the closest to the reader/writer 33-41.

Another reader/writer 33-42 is formed on a board 271 distant from the television receiver 261. When the remote commander 260 is placed adjacent to the reader/writer 33-42, an icon is displayed along a vector V282 across the reader/writer 33-42 and vertical to the side 262-4 closest to the reader/writer 33-42.

In this case, actually, the vector V282 is a vector passing through the display unit 262, but is calculated as a vector across a display unit of the display unit 262.

Thus, in this case, the icon is displayed so as to appear stepwise from the side 262-4 and gradually move upwards (towards the side 262-3).

Accordingly, the partner device is not limited to a mobile phone, and may be, for example, the remote commander 260 operated to input various commands to the television receiver 261, as shown in the example of FIG. 30.

Figure 31:
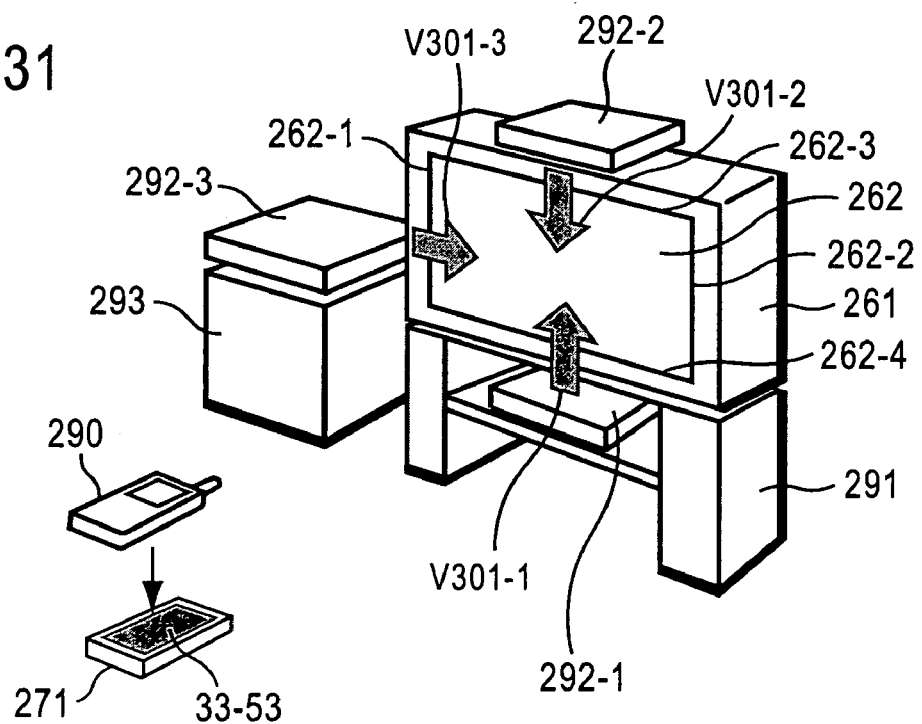
FIG. 31 is a diagram illustrating still another example of icon display.

In the example shown in FIG. 31, set-top boxes 292-1 through 292-3 are placed at the lower, upper, and left sides of the television receiver 261, respectively. Although three set-top boxes 292-1 through 292-3 (referred to simply as a set-top box 292 unless it is necessary to individually identify them) are shown in FIG. 31, in practice, the three set-top boxes are not placed at the same time and one set-top box is placed at any of the positions.

Figure 32:
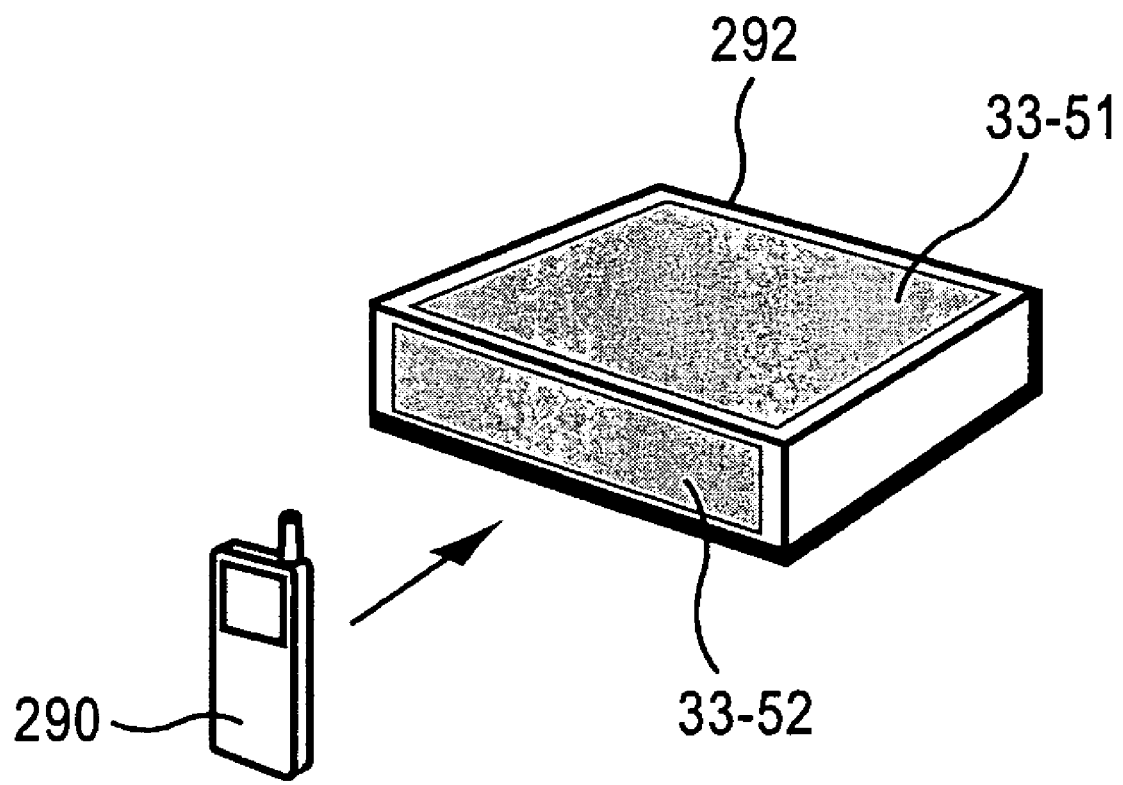
FIG. 32 is a diagram illustrating readers/writers arranged on a set-top box shown in FIG. 31.

As shown in FIG. 32, readers/writers 33-51 and 33-52 are placed on the top and front surfaces of the set-top box 292, respectively.

Thus, when a remote commander 290 for outputting signals wirelessly to the set-top box 292 is placed adjacent to the set-top box 292-1 (the set-top box 292-1 which is placed on a board 291 below the television receiver 261), an icon is displayed so as to move upwards along a vector V301-1 across the set-top box 292-1 and vertical to the side 262-4 closest to the set-top box 292-1.

When the remote commander 290 is placed adjacent to the set-top box 292-2 placed on the top surface of the television receiver 261, an icon is displayed so as to move downwards along a vector V301-2 across the set-top box 292-2 and vertical to the side 262-3 closest to the set-top box 292-2.

When the remote commander 290 is approaching the set-top box 292-3 placed on a board 293 to the left of the television receiver 261, an icon is displayed so as to appear stepwise from the side 262-1 along a vector V301-3 across the set-top box 292-3 and vertical to the side 262-1 closest to the set-top box 292-3.

In the example shown in FIG. 31, another reader/writer 33-53 is placed on the board 271 distant from the television receiver 261. However, the remote commander 290 is not the same as a remote commander of the television receiver 261 shown in the example of FIG. 30, but is a remote commander of the set-top box 292. Thus, when the remote commander 290 is placed adjacent to the reader/writer 33-53 on the board 271, an icon is displayed not along the vector V281 shown in FIG. 30 but along any of the vectors V301-1 through V301-3. Which vector the icon moves along is defined based on the position of the set-top box 292. Therefore, the icon is displayed in a similar manner to the case where the remote commander 290 is placed adjacent to any of the set-top boxes 292-1 through 292-3.

Although the foregoing description has been made in the context of a mobile phone and a remote commander as the partner device, the present invention can also be applied to a PDA (Personal Digital Assistants) or any other device.

The present invention is also applicable to information processing apparatuses other than personal computers and television receivers.

The icon may be modified in color or brightness (luminance) rather than in shape or density.

In the foregoing description, a terminal at the other end of a Bluetooth communication link is identified based on identification information (for example, a network address) stored in the RF tag 72 of the mobile phone 11; however, if the mobile phone 11 does not include the RF tag 72, the partner communication terminal can also be identified by controlling the output power of radio waves from the communication unit 73 used as a wireless module (Bluetooth module).

A communication system for identifying a partner communication terminal by controlling the output power of radio waves output from a wireless module is described below.

Figure 33:
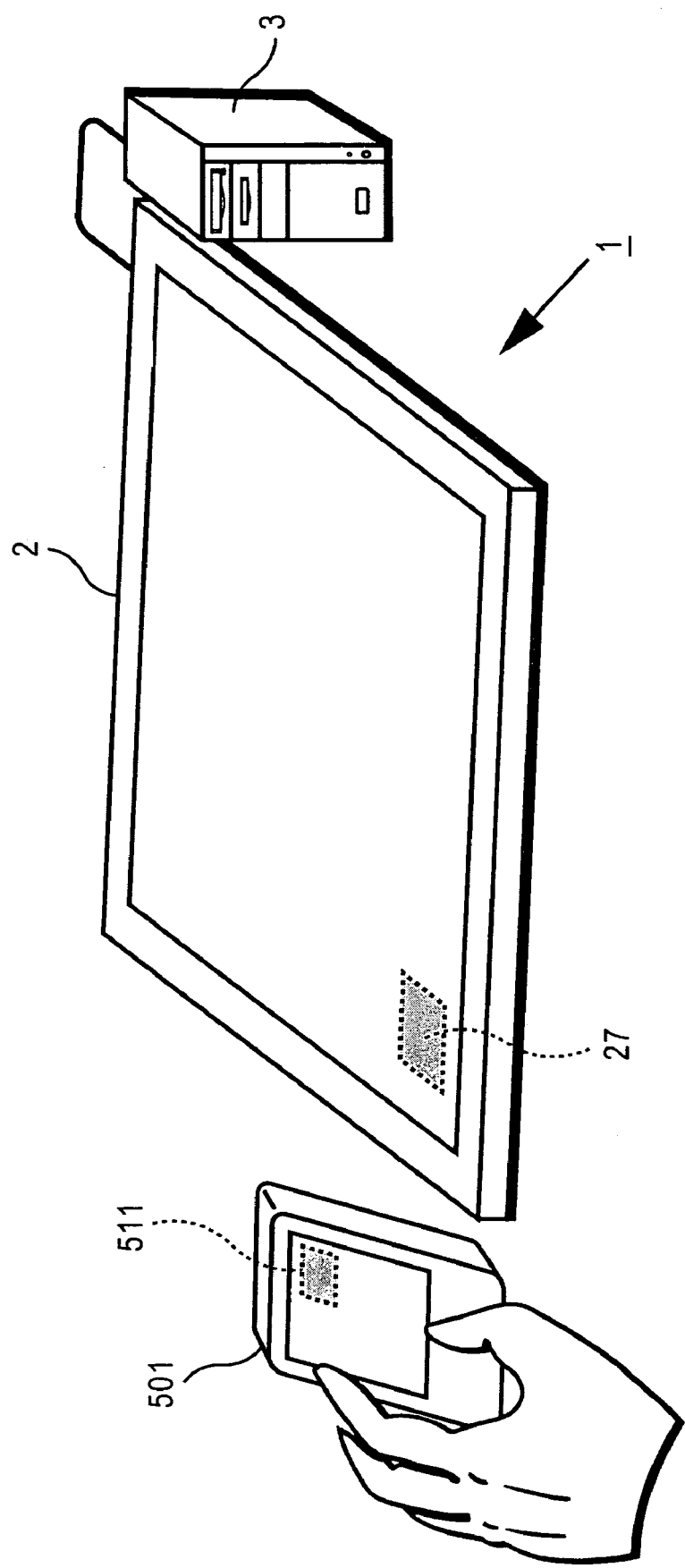
FIG. 33 is a diagram illustrating an example structure of a communication system according to the present invention.

FIG. 33 is a diagram illustrating an example structure of a communication system for identifying a partner communication terminal by controlling the output power of radio waves.

Although this example is described in the context of communication between the personal computer 1 and a PDA 501, if the PDA 501 is replaced by the mobile phone 11, a similar effect can be obtained.

For example, for identifying a Bluetooth communication partner and setting up a communication link with this partner, first, the PDA 501 reduces the output power of a communication module 511 to the minimum so that radio waves are emitted only within a range of, for example, several centimeters. In a power-saving mode in which the output power of radio waves is reduced, the communication module 511 repeats an "inquiry" procedure to search for a terminal within a range (for example, a range of several centimeters) covered by the radio waves. In Bluetooth communication, an "inquiry" phase is specified for searching for other Bluetooth terminals within a radio-wave coverage, and a "page" phase is specified for setting up a communication link (synchronization) with a terminal detected in the inquiry phase.

When a user places the PDA 501 near or on the personal computer 1 and radio waves emitted by the communication module 511 are received by the communication unit 27 (wireless module) of the personal computer 1, the inquiry is responded by the communication unit 27, so that the above-described inquiry and paging (invocation) operations are performed between the communication module 511 and the communication unit 27 to establish a communication link therebetween. The established communication link is effective in a very small range covered by the radio waves from the communication module 511 which is in the power-saving mode.

Thus, the communication module 511 disconnects the communication link so as to allow for communication with the communication unit 27 even if they are distant to some extent, and again establish a communication link with the communication unit 27 based on the previously obtained information (information obtained in the inquiry and paging procedures during the short-range communication) after the power mode of the communication module 511 is changed from the power-saving mode to the normal power mode.

The re-established communication link is effective in a radio-wave coverage of, for example, several ten meters, which is as broad as a normal coverage in Bluetooth communication, thus allowing for Bluetooth communication even if the distance between the personal computer 1 and the PDA 501 is sufficiently long.

As discussed above, unless the PDA 501 includes an RF tag containing a network address, the output power of the communication module is controlled, thereby setting up Bluetooth communication once a user places the PDA 501 adjacent to the personal computer 1.

In a case where the power mode of the communication module 511 can be switched seamlessly, the power mode may be switched from the power-saving mode to the normal power mode without disconnection of the communication link established in the power-saving mode.

Figure 34:
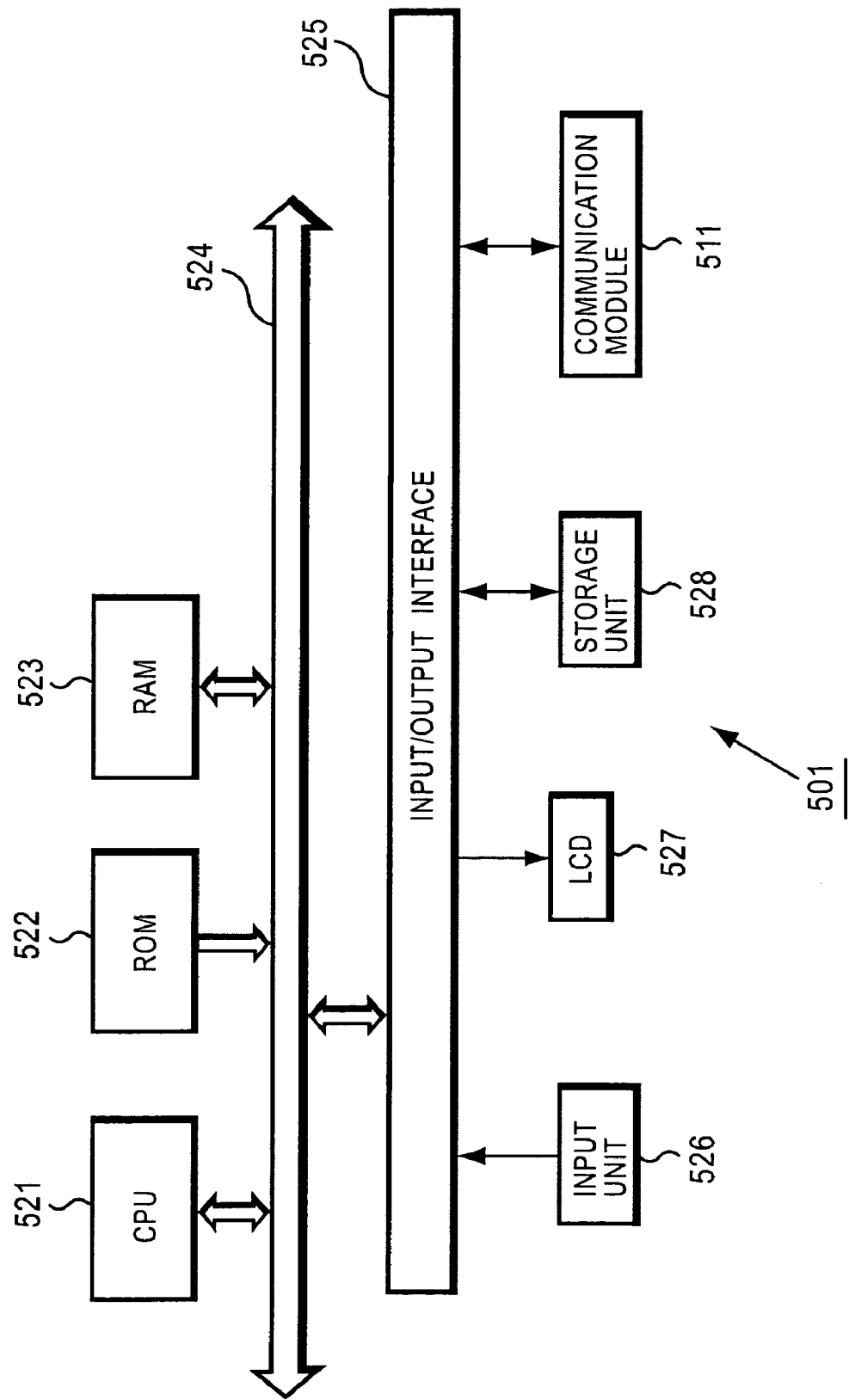
FIG. 34 is a block diagram illustrating an example structure of a PDA shown in FIG. 33.

FIG. 34 is a block diagram showing an example structure of the PDA 501 shown in FIG. 33.

The PDA 501 has basically a similar structure to the structure of the mobile phone 11 shown in FIG. 3, except that it does not include the communication unit 69 (which is a communication module for communication over a telephone communication), the microphone 70, the speaker 71, and the RF tag 72, and a detailed description of the overlapping portions is omitted, if appropriate.

A CPU 521 controls the overall operation of the PDA 501 according to, for example, a program extended from a ROM 522 to a RAM 523, and, as described above, controls the output power of radio waves from the communication module 511 according to the communication status.

Figure 35:
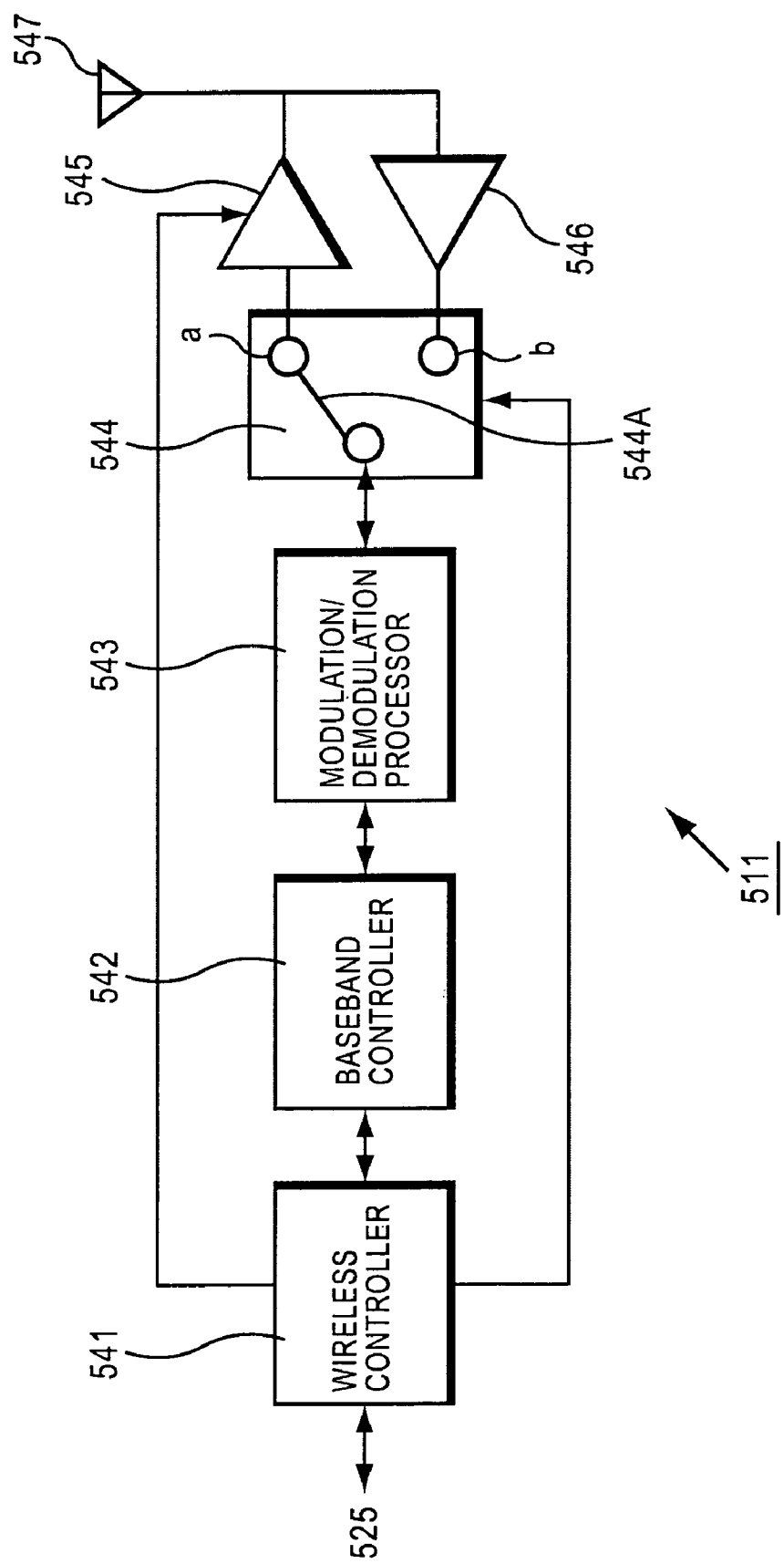
FIG. 35 is a block diagram illustrating an example structure of a communication module shown in FIG. 34.

FIG. 35 is a block diagram showing a detailed example structure of the communication module 511 shown in FIG. 34.

A wireless controller 541 controls a changeover switch 544 to connect a switch 544A to a contact "a" when information is transmitted from the communication module 511 to an external terminal, and to connect the switch 544A to a contact "b" when information sent from an external terminal is received. The wireless controller 541 also controls the gain of a power amp 545 based on control of the CPU 521 via a bus 524 and an input/output interface 525 to control the range (output power) covered by the radio waves radiated from an antenna 547.

More specifically, when the power-saving mode is instructed by the CPU 521, the wireless controller 541 controls the gain of the power amp 545 to minimize the range covered by the radio waves radiated from the antenna 547. On the other hand, when a partner communication terminal is identified and switching from the power-saving mode to the normal power mode is instructed, the wireless controller 541 controls the gain of the power amp 545 to increase the range covered by the output radio waves.

A baseband controller 542 controls a baseband signal of transmission and received signals. A modulation/demodulation processor 543 GFSK modulates or spreads the output of the baseband controller 542 based on the hopping frequency, and outputs the resulting signal from the antenna 547 via the power amp 545. The modulation/demodulation processor 543 also de-spreads or GFSK demodulates the output of an LNA (Low Noise Amplifier), and outputs the resulting signal to the baseband controller 542.

The structure of the personal computer 1 is similar to the structure shown in FIG. 2, and a description thereof is omitted. In the communication system shown in FIG. 33, the personal computer 1 need not include the reader/writer 33 shown in FIG. 2.

The operation of the communication system shown in FIG. 33 is described below with reference to the flowchart of FIG. 36. In this example, the operation of identifying a Bluetooth communication partner and setting up communication is described.

For example, when Bluetooth communication is instructed by a user, the communication module 511 is activated under the control from the CPU 521 to set the power mode thereof to the power-saving mode in step S201. In step S202, the communication module 511 repeats the inquiry procedure to search for an adjacent terminal. During the inquiry performed in step S202, since the power-saving mode is set and the radio-wave coverage is reduced to the minimum, IQ packets (inquiry packets) are repeatedly broadcasted to a range of, for example, several centimeters from the antenna 547.

Meanwhile, in step S211, the communication unit 27 of the personal computer 1 repeats an inquiry scan and a page scan, and stands by until the inquiry and paging procedures are requested from another terminal.

When a user places the PDA 501 adjacent to the personal computer 1 and the communication unit 27 of the personal computer 1 is present in the range covered by the radio waves from the communication module 511 of the PDA 501, an IQ packet broadcasted from the communication module 511 is received by the communication unit 27 in step S222.

When the IQ packet broadcasted from the communication module 511 is received, then in step S223, in response, the communication unit 27 transmits an FHS packet to the communication module 511. The FHS packet includes attribute information of the personal computer 1 (Bluetooth slave), such as information indicating the Bluetooth address and Bluetooth clock of the personal computer 1.

When the FHS packet transmitted from the communication unit 27 is received in step S203, then in step S204, the communication module 511 issues a connection request to the communication unit 27.

Specifically, an ID packet is transmitted from the communication module 511 to the communication unit 27. When the same ID packet as that ID packet is returned to the communication module 511 from the communication unit 27, an FHS packet including the Bluetooth address and Bluetooth clock of the communication module 511 is transmitted from the communication module 511 to the communication unit 27.

When the FHS packet transmitted from the communication module 511 is received by the communication unit 27 in step S224, synchronization in frequency (frequency hopping pattern) and time (time slot) is set up between the communication module 511 and the communication unit 27, so that a data link (communication link) is established therebetween (state 1).

For example, when an initial Bluetooth data link is established between the communication unit 27 and the communication module 511, then in step S205, the communication module 511 transmits a PIN (Personal Identification Number) code to the communication unit 27 for mutual authentication. The PIN code transmitted from the communication module 511 is received by the communication unit 27 in step S225, and, then, various link keys are set up between the communication module 511 and the communication unit 27 based on the PIN code, random number, and so on. The PIN code may be encrypted using a public key supplied from the communication unit 27 to the communication module 511 before it is transmitted and received. In this case, the communication unit 27 manages a secret key corresponding to the public key supplied to the communication module 511. This improves the security with more reliable Bluetooth communication only between the personal computer 1 and the PDA 501.

Since the thus established communication link is effective in a range of several centimeters covered by the radio waves from the communication module 511 which is in the power-saving mode, the communication module 511 requests the communication unit 27 to temporarily disconnect the data link in step S206 in order to switch the power mode so as to allow communication with the communication unit 27 even if they are distant to some extent. The information obtained from the previous processing, such as the Bluetooth address and PIN code of the communication unit 27, is stored in the communication module 511.

The communication unit 27 which receives the request in step S226 stores the information obtained from the previously processing, such as the Bluetooth address and PIN code of the communication module 511, like the communication module 511, and disconnects the data link (state 2).

In step S207, the communication module 511 sets the power mode, in which the output power is controlled, to the normal power mode under the control from the CPU 521 in order to again establish a data link with the communication unit 27. Thus, the Bluetooth radio waves from the communication module 511 can cover a range of, for example, several ten meters.

Then in step S208, the communication module 511 identifies the personal computer 1 as the partner communication terminal based on the information stored immediately before the disconnection of the data link, and issues a connection request to the communication unit 27.

In step S227, the request is received by the communication unit 27, and a connection is set up between both terminals, so that a data link is established between the communication module 511 and the communication unit 27. That is, Bluetooth communication can be performed in a range of, for example, several ten meters, covered by the radio waves from the communication module 511 which is in the normal power mode (state 3).

In the way discussed above, the communication system shown in FIG. 33 which identifies an adjacent terminal as the partner communication terminal is applied to an information processing system formed of the personal computer 1 and mobile phone 11 shown in FIG. 1, and an icon indicating the adjacent terminal is displayed on the LCD 32 of the personal computer 1 according to its orientation (vector).

Figure 37:
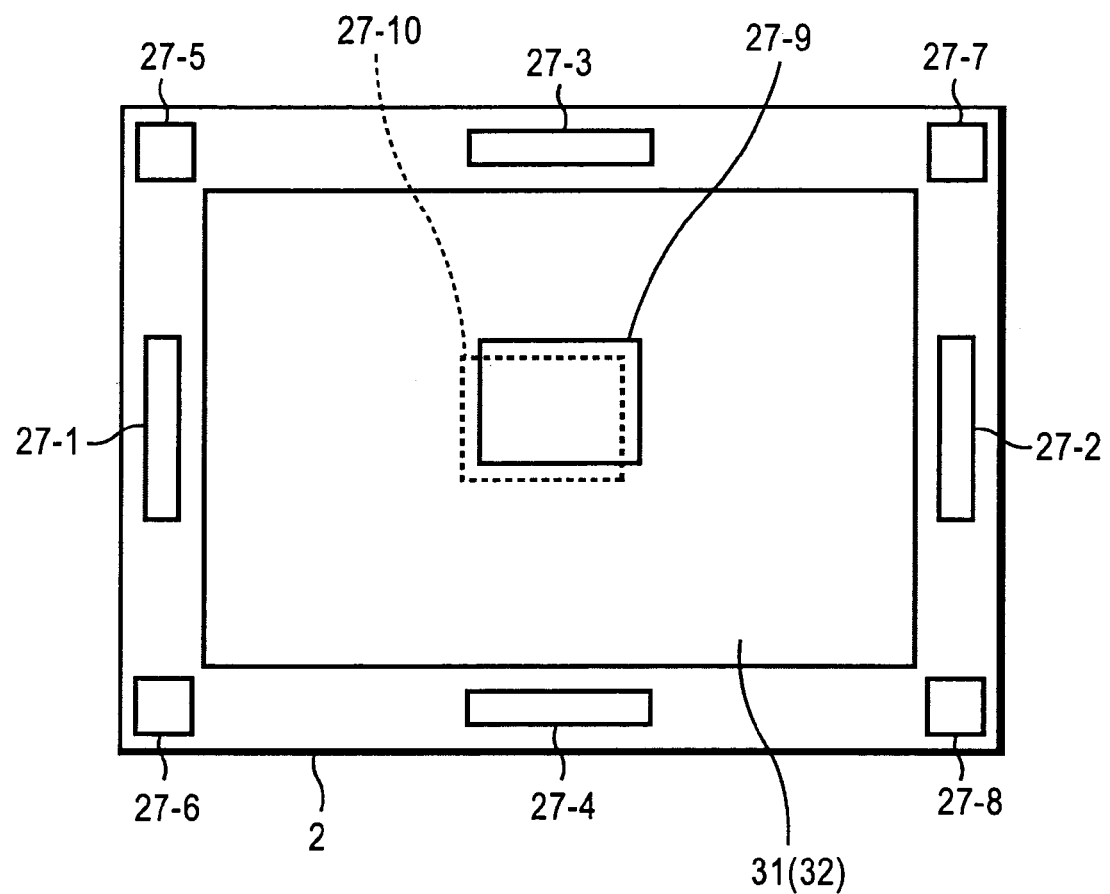
FIG. 37 is a diagram illustrating an example structure of an input display unit of a personal computer.

As shown in FIG. 37, the communication units 27-1 through 27-10 are placed so as to correspond to the readers/writers 33-1 through 33-10 arranged in the manner shown in FIG. 11.

Figure 36:
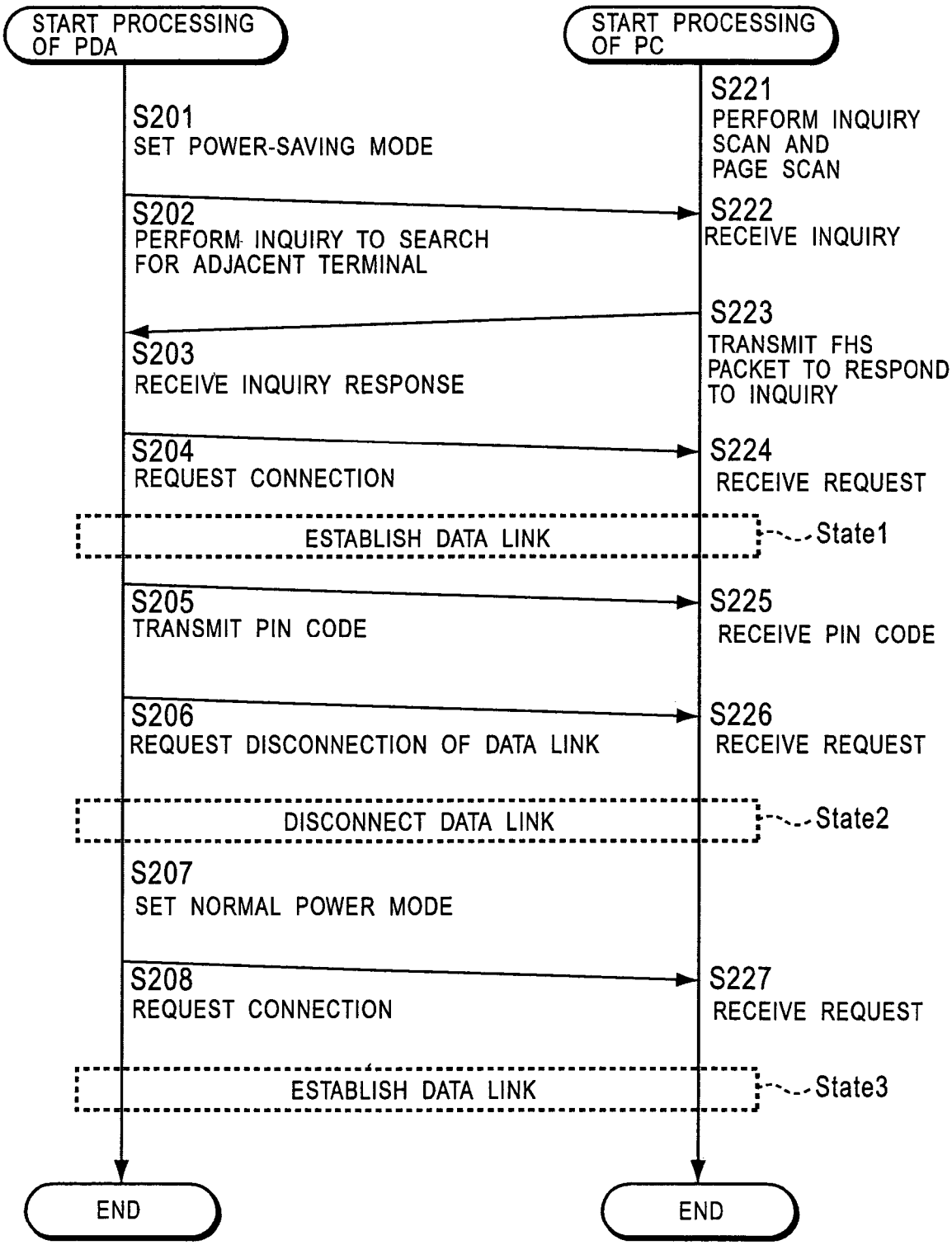
FIG. 36 is a flowchart showing processing of the communication system shown in FIG. 33.

Based on any of the communication units 27-1 through 27-10 which detects the communication module 511 (the communication unit 73 of the mobile phone 11) of the PDA 501 which is in the power-saving mode, or based on any communication unit which executes the process shown in FIG. 36 with respect to the communication module 511 to establish a communication link, the vector indicating the moving direction of the PDA 501 is determined to control display of an icon representing the PDA 501 displayed on the LCD 32 (control the direction in which the icon moves).

Communication units (wireless modules) may also be placed so as to correspond to the readers/writers 33-21 and 33-22 of the notebook personal computer 201 shown in FIG. 28, the readers/writers 33-21 and 33-22 of the desktop personal computer 231 shown in FIG. 29, the readers/writers 33-41 and 33-42 placed on the television receiver 261 and the board 271 shown in FIG. 30, and the readers/writers 33-51 through 33-53 placed on the board 271 and the set-top boxes 292-1 through 292-3 shown in FIG. 31, in order to execute the process shown in FIG. 36 with respect to a communication module of an adjacent mobile phone or remote controller to identify the communication unit with which the communication link is established, thereby determining the vector of the mobile phone or the remote controller to control icon display according to the vector orientation.

The output power of the radio waves can be controlled in the above-described way to identify a partner communication terminal to detect the side to which the partner terminal is adjacent, thereby achieving the desirable user interface.

The series of the above-described operations may be executed by software. In this case, a problem constituting the software is installed from a network or a recording medium to a computer incorporated in dedicated hardware or, for example, a general-purpose personal computer capable of executing various functions by installing various programs.

This recording medium is formed of not only a packaged media such as, as shown in FIG. 2, the magnetic disc 41 (including a floppy disk), optical disc 42 (including a CD-ROM (Compact Disk-Read Only Memory) and DVD (Digital Versatile Disk)), magneto-optical disc 43 (including an MD (Mini-Disk)), or semiconductor memory 44 having a program recorded therein, which is distributed separately from the apparatus to offer the program to users, but also the ROM 22 having a program recorded therein, which is offered to users as is incorporated in the apparatus in advance or a hard disk contained in the storage unit 26.

INDUSTRIAL APPLICABILITY

According to the present invention, therefore, when an electronic device is placed adjacent, an icon corresponding to the electronic device is displayed with the position, color, or brightness changing over time, thus allowing reliable recognition of the communicating electronic device.

According to the present invention, furthermore, an icon is modified when communication with an electronic device is set up, thus allowing a user to reliably determine the timing of executing processing with respect to the electronic device using the icon to achieve a better user interface.

The invention claimed is:

1. An information processing apparatus for displaying an icon corresponding to an electronic device on a display unit and for performing a predetermined process with respect to the electronic device using the icon, said information processing apparatus comprising:

a detection means for detecting that the electronic device is adjacent thereto;

vector determination means for, when the detection means detects the electronic device adjacent thereto, determining a vector directed towards the center of the display unit from the position corresponding to the detection means which detects the electronic device; and display means for displaying the icon in a moving manner along the vector determined by the vector determination means, wherein the display means displays the icon so as to move along a line across the electronic device and vertical to one of the four sides of the display unit that is substantially rectangular, said side being the closest to the detection means.

2. An information processing apparatus according to claim 1, wherein the display means displays the icon so as to shift the position of the icon along a line towards the inside of the display unit from a side of the display unit.

3. An information processing apparatus according to claim 1, further comprising communication means for setting up communication with the electronic device when the detection means detects the electronic device adjacent thereto, wherein the display means modifies display of the icon when the communication means sets up communication with the electronic device.

4. An information processing apparatus according to claim 3, wherein the detection means includes a reader/writer which communicates with an RF tag of the electronic device via electromagnetic induction, and the communication means performs short-range wireless communication with the electronic device.

5. An information processing apparatus according to claim 3, wherein the detection means detects the electronic device using Bluetooth communication in a power-saving mode in which a device is searched for to specify a partner.

6. An information processing apparatus according to claim 1, further comprising identification means for identifying the electronic device when the detection means detects the electronic device adjacent thereto.

7. An information processing apparatus according to claim 6, wherein the identification means obtains identification information from the electronic device to determine the device type or category of the electronic device based on the identification information.

8. An information processing method for an information processing apparatus for displaying an icon corresponding to an electronic device on a display unit and for performing a predetermined process with respect to the electronic device using the icon, said information processing method comprising:

detecting that the electronic device is adjacent using a detection unit;
determining, when the adjacent electronic device is detected, a vector directed towards the center of the display unit from the position corresponding to the detection unit which detects the electronic device; and
displaying the icon in a moving manner along the vector, the moving manner including displaying the icon so as to move along a line across the electronic device and vertical to one of the four sides of the display unit that is substantially rectangular, said side being the closest to the detection unit which detects the electronic device.

9. An information processing apparatus comprising:
detection means for detecting an electronic device adjacent thereto;
display means for displaying an icon corresponding to the electronic device when the detection means detects the electronic device adjacent thereto;
communication means for setting up communication with the electronic device when the detection means detects the electronic device adjacent thereto; and
modification means for modifying the icon when the communication means sets up communication with the electronic device,
wherein the display means displays the icon so as to move along a line across the electronic device and vertical to one of the four sides of the display means that is substantially rectangular, said side being the closest to the detection means.

10. An information processing apparatus according to claim 9, further comprising identification means for identifying the electronic device when the detection means detects the electronic device adjacent thereto.

11. An information processing apparatus according to claim 10, wherein the identification means obtains identification information from the electronic device to determine the device type or category of the electronic device based on the identification information.

12. An information processing apparatus according to claim 9, wherein the detection means includes a reader/writer which communicates with an RF tag of the electronic device via electromagnetic induction, and
the communication means performs short-range wireless communication with the electronic device.

13. An information processing method comprising:
detecting an adjacent electronic device;
displaying an icon corresponding to the electronic device when the adjacent electronic device is detected;
setting up communication with the electronic device when the adjacent electronic device is detected; and
modifying the icon when communication with the electronic device is set up,
wherein displaying comprises displaying the icon so as to move along a line across the electronic device and vertical to one of the four sides of a display unit that is substantially rectangular, said side being the closest to a detection unit which detects the electronic device.

14. An information processing apparatus for displaying an icon corresponding to an electronic device on a display unit and for performing a predetermined process with respect to the electronic device using the icon, said information processing apparatus comprising:
detection means for detecting that the electronic device is adjacent thereto; and
display means for displaying the icon corresponding to the electronic device in a moving manner when the detection means detects the electronic device adjacent thereto, the moving manner comprising displaying the icon so as to move along a line across the electronic device and vertical to one of the four sides of the display unit that is substantially rectangular, said side being the closest to the detection means.

15. An information processing apparatus according to claim 14, wherein the display means displays the icon so as to shift the position of the icon along a line from a side of the display unit.

16. An information processing apparatus according to claim 14, wherein the display means displays a portion of the icon and then displays the entirety of the icon.

17. An information processing apparatus according to claim 14, further comprising communication means for setting up communication with the electronic device when the detection means detects the electronic device adjacent thereto,
wherein the display means modifies display of the icon when the communication means sets up communication with the electronic device.

18. An information processing apparatus according to claim 14, wherein the detection means includes a reader/writer which communicates with an RF tag of the electronic device via electromagnetic induction.

19. An information processing apparatus according to claim 14, wherein the detection means detects the electronic device using Bluetooth communication in a power-saving mode in which a device is searched for to specify a partner.

20. An information processing apparatus according to claim 14, further comprising identification means for identifying the electronic device when the detection means detects the electronic device adjacent thereto.

21. An information processing apparatus according to claim 20, wherein the identification means obtains identification information from the electronic device to determine the device type or category of the electronic device based on the identification information.

22. An information processing method for an information processing apparatus for displaying an icon corresponding to an electronic device on a display unit and for performing a predetermined process with respect to the electronic device using the icon, said information processing method comprising:
detecting that the electronic device is adjacent; and
displaying the icon corresponding to the electronic device in a moving manner when the adjacent electronic device is detected, the moving manner comprising displaying the icon so as to move along a line across the electronic device and vertical to one of the four sides of the display unit that is substantially rectangular, said side being the closest to a detection unit which detects the electronic device.

* * * * *